US008942514B2

(12) United States Patent
Yehezkel et al.

(10) Patent No.: US 8,942,514 B2
(45) Date of Patent: Jan. 27, 2015

(54) IMAGE STORAGE AND RETRIEVAL BASED ON EYE MOVEMENTS

(71) Applicant: Intel Corporation, Santa Clara, CA (US)

(72) Inventors: Raanan Yehezkel, Kiryat Ekron (IL); Michal Jacob, Haifa (IL)

(73) Assignee: Intel Corporation, Santa Clara, CA (US)

( * ) Notice: Subject to any disclaimer, the term of this patent is extended or adjusted under 35 U.S.C. 154(b) by 181 days.

(21) Appl. No.: 13/629,706

(22) Filed: Sep. 28, 2012

(65) Prior Publication Data

US 2014/0093187 A1 Apr. 3, 2014

(51) Int. Cl.
*G06K 9/54* (2006.01)
*G06F 17/30* (2006.01)

(52) U.S. Cl.
CPC .... *G06F 17/30244* (2013.01); *G06F 17/30274* (2013.01); *G06F 17/30265* (2013.01)
USPC .......................................................... 382/305

(58) Field of Classification Search
CPC ...... G06K 9/0061; G06K 9/60; G06T 7/0042; H04N 13/0475; H04N 13/0477; H04N 13/0479; H04N 13/0481; G06F 3/013; G06F 3/485; G02B 27/0093; G02B 27/225; G02B 2027/0187; G02B 2027/0198; G03B 2213/025; A61B 3/113
See application file for complete search history.

(56) References Cited

U.S. PATENT DOCUMENTS

| | | | | |
|---|---|---|---|---|
| 4,974,010 | A * | 11/1990 | Cleveland et al. | 396/51 |
| 6,351,273 | B1 * | 2/2002 | Lemelson et al. | 715/786 |
| 6,886,137 | B2 * | 4/2005 | Peck et al. | 715/785 |
| 7,365,738 | B2 * | 4/2008 | Molander et al. | 345/157 |

* cited by examiner

*Primary Examiner* — Jose Couso
(74) *Attorney, Agent, or Firm* — Kacvinsky Daisak Bluni PLLC

(57) ABSTRACT

Various embodiments are generally directed to creating and using an index based on eye movements of the human eye to store and retrieve images in an image database. An apparatus comprises a processor circuit and a storage communicatively coupled to the processor circuit and storing instructions operative on the processor circuit to receive a first eye movement data associated with a first image provided by the apparatus from an image database stored in the storage; determine a first identity of a first object at a first focus region in the first image indicated by the first eye movement data; search the image database for an image depicting the first object; and provide a second image depicting the first object from the image database. Other embodiments are described and claimed herein.

34 Claims, 10 Drawing Sheets

2300

2400

IMAGE STORAGE AND RETRIEVAL BASED ON EYE MOVEMENTS

BACKGROUND

The use of text-based search engines to locate information, including images, stored within a single computing device or across a great many computing devices accessible via a network (e.g., the Internet) is commonplace. Unfortunately, while text-based searching has proven quite effective in finding items of text (e.g., literature, lyrics, etc.), as well as non-text items that are somehow linked to descriptive text, it often proves of limited value in locating an image (whether a still image or an image of a video) that depicts a particular sought-for item.

A longstanding approach to enabling a search for an image depicting a particular item has been the manual tagging of images, by people, with descriptive text. Unfortunately, given that images are captured by all kinds of people all over the world with varying opinions of what constitutes an effective description, the effectiveness of such descriptive text varies widely. Also, there is a tendency among many people to describe only objects in their captured images that are important to them, thereby failing to describe other objects in their captured images that may be of interest to other people. Further, there are many people who capture images, but never actually tag them with any descriptive text, at all, sometimes simply as a result of finding it difficult to use text-labeling features of image-handling devices to create such textual tags. As a result, there are a great many images that are not tagged with any searchable text description, whatsoever.

One approach to resolving insufficient or missing descriptive text for many images has been to employ people to review large numbers of images and manually create or edit textual tags. Unfortunately, such an approach is time consuming and quickly becomes cost-prohibitive. Another past approach attempts to resolve these problems by automating the textual tagging of images. Specifically, computing devices have been used to scan images, employ various visual recognition algorithms to identify everything that is depicted, and tag those images with automatically-generated text listing the objects identified. Unfortunately, such an approach tends to require considerable computing resources, and can misidentify or fail to identify objects in those images. Further, neither of these approaches can discern what object(s) in those images were of interest to the people who captured them, or the relationships between objects. It is with respect to these and other considerations that the techniques described herein are needed.

DETAILED DESCRIPTION

Figure 1:
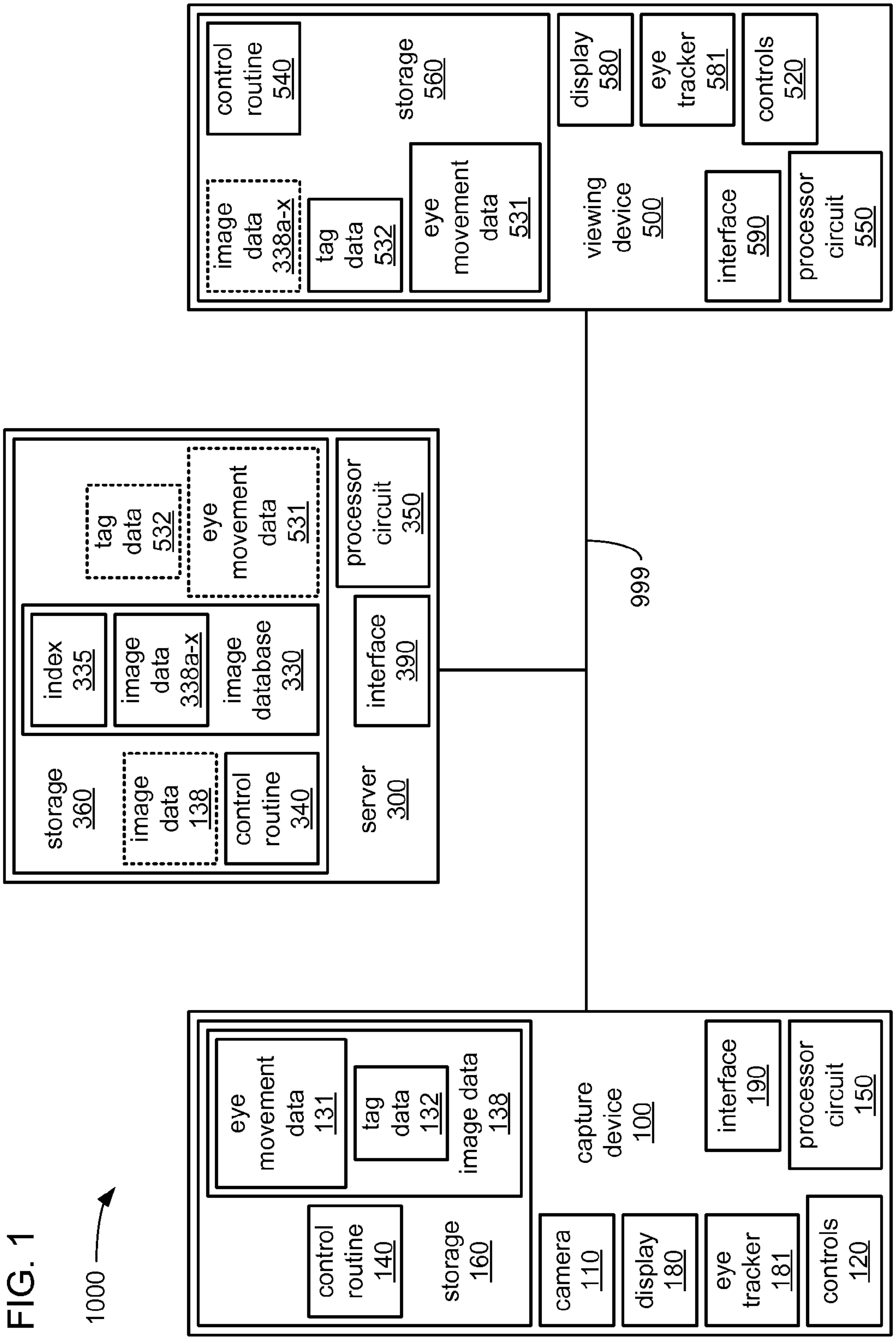
FIG. 1 illustrates a first embodiment of interaction among computing devices.

Various embodiments are generally directed to creating and using an index based on detected aspects of eye movements of the human eye to store and retrieve images in an image database. More specifically, an eye tracker is employed to monitor the movements of a person's eye while viewing an image to reveal focus regions (areas of an image at which a greater proportion of fixations occur over time than other areas) and saccades (movements of their eye between fixations). Focus regions are inferred to be areas of an image where objects of interest to that person exist. Higher proportions of saccades occurring between some focus regions versus others are inferred to indicate relationships that may exist among objects depicted in the focus regions between which the saccades occur, and/or are inferred to indicate spatial relationships between objects depicted in a focus region and fixations surrounding them between which the saccades occur.

Focus regions are employed as indications of areas of an image to which visual recognition and/or other automated algorithms may be directed to identify the objects of the image found to be at those focus regions to automatically generate tags for use in indexing a database of images. Also incorporated into the index are indications of possible relationships inferred as exiting between objects within focus regions between which a high proportion of saccades (or series of saccades) are found to occur. Further, spatial relationships between objects at focus regions and fixations between which a high proportion of saccades are also found to occur are also incorporated into the index.

Tracking of eye movements may occur as an image is captured by tracking the eye movements of an eye of the person operating a capture device to capture the image. In so doing, indications of what object(s) in that image are of interest to that person and relationships concerning those object(s) inferred as perceived by that person are incorporated into the index. Later, tracking of eye movements may occur as that image is viewed by other people during searches of images by tracking the eye movements of each such other person as they view the same image. In so doing, search results of images presented to each such person may be more quickly narrowed to images depicting objects similar to or related to objects of interest to them. Also in so doing, indications of what object(s) in that image are of interest to each of them and relationships concerning those object(s) inferred as perceived by them are also incorporated into the index.

It is expected that each person looking at a given image will demonstrate their own unique eye movements stemming from and leading to their unique focus regions and unique relationships associated with objects identified at those focus regions. Thus, over time, the indexing for an image originally having only information gleaned from eye movements of the person that captured it will eventually incorporate information gleaned from eye movements of many people, thereby uncovering more focus regions, more objects to be identified, and more relationships involving those objects. As the index is increasingly augmented with such information, its effectiveness in supporting searches for images depicting objects of interest is increasingly improved.

In one embodiment, for example, an apparatus comprises a processor circuit and a storage communicatively coupled to the processor circuit and storing instructions operative on the processor circuit to receive a first eye movement data associated with a first image provided by the apparatus from an image database stored in the storage; determine a first identity of a first object at a first focus region in the first image indicated by the first eye movement data; search the image database for an image depicting the first object; and provide a second image depicting the first object from the image database. Other embodiments are described and claimed herein.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may comprise a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 illustrates a block diagram of an image storage and retrieval system 1000 comprising one or more of a capture device 100 operable by a person capturing images, a server 300 storing images, and a viewing device 500 operable by a person searching for and viewing images. Each of the computing devices 100, 300 and 500 may be any of a variety of types of computing device, including without limitation, a desktop computer system, a data entry terminal, a laptop computer, a netbook computer, a tablet computer, a ultrabook computer, a handheld personal data assistant, a smartphone, a digital camera, a body-worn computing device incorporated into clothing, a computing device integrated into a vehicle, a server, a cluster of servers, a server farm, etc.

As depicted, the computing devices 100, 300 and 500 exchange signals conveying at least image data and data used in searching for images through a network 999, although one or more of these computing devices may exchange other data entirely unrelated to images. In various embodiments, the network 999 may be a single network possibly limited to extending within a single building or other relatively limited area, a combination of connected networks possibly extending a considerable distance, and/or may include the Internet. Thus, the network 999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission.

In various embodiments, and as will be explained in greater detail, the capture device 100 is operated by a person to capture an image and any textual tags that may be manually entered by that person. Also, during capture of the image, eye movements of an eye of that person are automatically captured, along with any tags concerning the image that are automatically generated by the capture device 100 (e.g., GPS coordinates, camera compass direction, etc.). Subsequently, the capture device 100 transmits the captured image and associated information concerning eye movements and/or tags to the server 300 via the network 999 (or through another mechanism, possibly through another computing device coupled to the network 999) to be added to a database maintained by the server 300.

Upon receipt of the captured image and associated eye and/or tag information from the capture device 100, the server 300 stores the captured image in an image database, and adds any such received tag information to an index used by server 300 in locating images in the image database. The server 300 examines the eye movements of the operator of the capture device 100 to determine locations of fixations and the saccades occurring therebetween. From the fixations and saccades, the server 300 further determines focus regions of the image in which clusters of higher proportions of fixations occurred, and determines where higher proportions of saccades occurred between focus regions. The server 300 then employs various visual recognition and/or feature extraction algorithms to identify objects present in the captured image at the focus regions, and augments the index with indications of those identified objects. The server 300 further augments the index with indications of relationships inferred as possibly existing between objects located at focus regions between which higher proportions of saccades are found to occur (either single saccades directly between those focus regions, or series of saccades through fixations not associated with either of those focus regions), and spatial relationships of objects located at focus regions and fixations where higher proportions of saccades are found to occur between those focus regions and those fixations.

It should be noted that directing the use of visual recognition algorithms to identify objects or other depicted at the locations of focus regions in an image, instead of employing visual recognition algorithms to identify all objects depicted throughout an image, makes advantageous use of the indications provided by focus regions of where there are objects in the image that are deemed to be of sufficient importance as to be useful to identify versus other objects in the image. Visual recognition algorithms typically consume considerable computational resources, and such targeting of the use of visual recognition algorithms towards focus regions makes more efficient use of those resources. Further, the use of visual recognition algorithms to identify all objects in an image can generate a far greater quantity of data for each image, requiring considerably more in the way of storage resources, and such targeting of the use of visual recognition algorithms towards focus regions avoids generating considerable quantities of unnecessary data requiring storage. Still, it may be that the server 300 employs one or more recognition algorithms optimized to analyze broader characteristics of the captured image captured by the capture device 100 to broadly categorize it (e.g., as outdoor scenery, as indoor scenery, as artificially created scenery created through paint or computer-generated animation, etc.), and then augment the index to include such additional tag information.

At a later time, the viewing device 500 is operated by another person (or possibly the same person who operated the capture device 100 to capture images) to search for an image depicting a particular object of interest to them. That person may initially begin their search in any of a variety of ways, including and not limited to, entering or in some other way selecting text to search for images depicting what they describe in that entered text. Such operation of the viewing device 500 results in the viewing device 500 transmitting the entered text to the server 300 via the network 999 as search terms to be used in searching for an image. In response, the server 300 searches its database, employing its index to retrieve one or more initial images tagged with text information matching and/or related to the text received from the viewing device 500. The server 300 then transmits the initial multitude of retrieved images to the viewing device 500 via the network 999.

Upon receipt of these one or more initial images retrieved from the server 300, the viewing device 500 visually presents the initial image(s) on a display of the viewing device 500, allowing the person operating the viewing device 500 to view them. As this person views these image(s), eye movements of at least one of their eyes are captured, enabling at least some of their fixations and saccades on one or more images they view to be identified. From these, focus regions and saccades related to those focus regions are identified. The identifying of fixations, saccades, focus regions, and/or saccades related to those focus regions, at least partly, may be at least partly performed by the viewing device or may be performed entirely by the server 300. However, the focus regions and saccades related thereto are identified, the server 300 employs this information to retrieve one or more additional images from the database that depict objects matching or in some way related to the objects depicted at those focus regions, and then transmits the one or more additional images to the viewing device 500. Upon receiving the additional image(s), the viewing device 500 displays the additional image(s), either in addition to or in lieu of the initial one or more images. Thus, eye movements are employed to refine the search for an image, and this refinement may be repeated by again capturing eye movements as the viewing device 500 is operated to view the additional image(s) to yet further refine searching.

The server 300 may also employ the information concerning focus regions and saccades related thereto to augment the index where at least some of those focus regions are found to occur in images at locations where focus regions were not previously identified. If one or more of these focus regions are not already included in the index, then the server 300 employs various visual recognition algorithms to identify objects at those newly identified focus regions, and augments the index with indications of those newly identified objects. Thus, the viewing of images of the database maintained by the server 300, over time and by numerous people using such devices as the viewing device 500, results in the index being improved over time so that desired images already in the database may be found more readily by others in future searches.

This ability to augment the index enables the index to adapt over time as cultural and societal changes bring about changes to what objects that may be depicted in images are generally of interest to people. This also addresses the issue of an image captured with the capture device 100 initially having information concerning fixations, saccades, focus regions, and/or other aspects of eye movements only of the person who operated the capture device 100 to capture it. As a result of this ability to augment the index, the eye movements of an eye of the person operating the capture device 100 do not indefinitely remain the only influence on the effectiveness with which the image may be found in future searches.

In various embodiments, the capture device 100 comprises a storage 160 storing a control routine 140 and an image data 138, a processor circuit 150, controls 120, a display 180, a camera 110, an eye tracker 181, and an interface 190 coupling the capture device 100 to the network 999. The image data 138 comprises eye movement data 131 and tag data 132. In executing a sequence of instructions of at least the control routine 140, the processor circuit 150 is caused to monitor the controls 120 to enable an operator of the capture device 100 to operate the controls 120 to signal the processor circuit 150 with a command to operate the camera 110 to capture an image of whatever is in the view of the camera 110.

It is envisioned that, being a computing device configured to serve as a digital camera device (e.g., a smartphone with a built-in camera, a digital camera, etc.), the operator views the display 180 to see what is in the view of the camera 110 as they operate the controls 120 to signal the capture device 100 to capture an image. In other words, it is envisioned that the display 180 serves as an electronic equivalent of a camera eyepiece. Therefore, the eye tracker 181 is positioned relative to the display so as to be able to track eye movements of at least one eye of the operator as the operator looks at the display 180 to aim the camera 110 at whatever they choose to capture an image of. The processor circuit 150 is caused, in response to operation of the controls 120 by the operator, to track those eye movements, and identify the fixations and saccades that occur in what ultimately becomes a captured image displayed on the display 180. Alternatively or additionally, it is envisioned that, after having captured the image, the operator may again view the captured image on the display 180, thereby potentially providing another opportunity to track their eye movements as they view the captured image.

Studies of the manner in which the human brain (in particular, the visual cortex) performs in order to view an image reveal that, unlike a typical computing device employing a raster-scan camera, the human brain does not perform the equivalent of single-pass detailed "scan" of an entire image as a single unitary piece of information. Instead, the human brain initiates movement of the eyes about the image in a sequence of fixations and saccades. Fixations are observations of a certain point in the visual field (with a typical duration of 200 ms to 300 ms) leading to an accurately processed scanning of approximately 2° of the visual field, and saccades are eye movements relocating the point of fixation (with a typical duration of 40 ms, depending on the saccade amplitude) during which there is suppression of sight such that the saccades are not actually perceived as having occurred. In this way, the human brain builds up a mental picture of what is shown in the image in a somewhat piecemeal fashion. As time passes, what objects in an image are more of interest than others to a particular person becomes increasingly clear as a greater proportion of their fixations begin to accumulate in a clustered fashion about one or more focus regions at which objects of interest are located within the image. Further, saccades might occur in increasingly greater proportion between specific focus regions, giving rise to the possibility of there being a relationship between one or more objects at one focus region and one or more objects at another focus region. It should be noted that such saccades occurring in high proportion between two particular focus regions may not be single saccades occurring directly between them, but may include series of saccades separated by fixations not associated with any focus region. Still further, as time passes, saccades occurring between a focus region and one or more fixations not associated with a focus region may also suggest a spatial relationship between that focus region and either those fixations or other focus regions.

Figure 2:
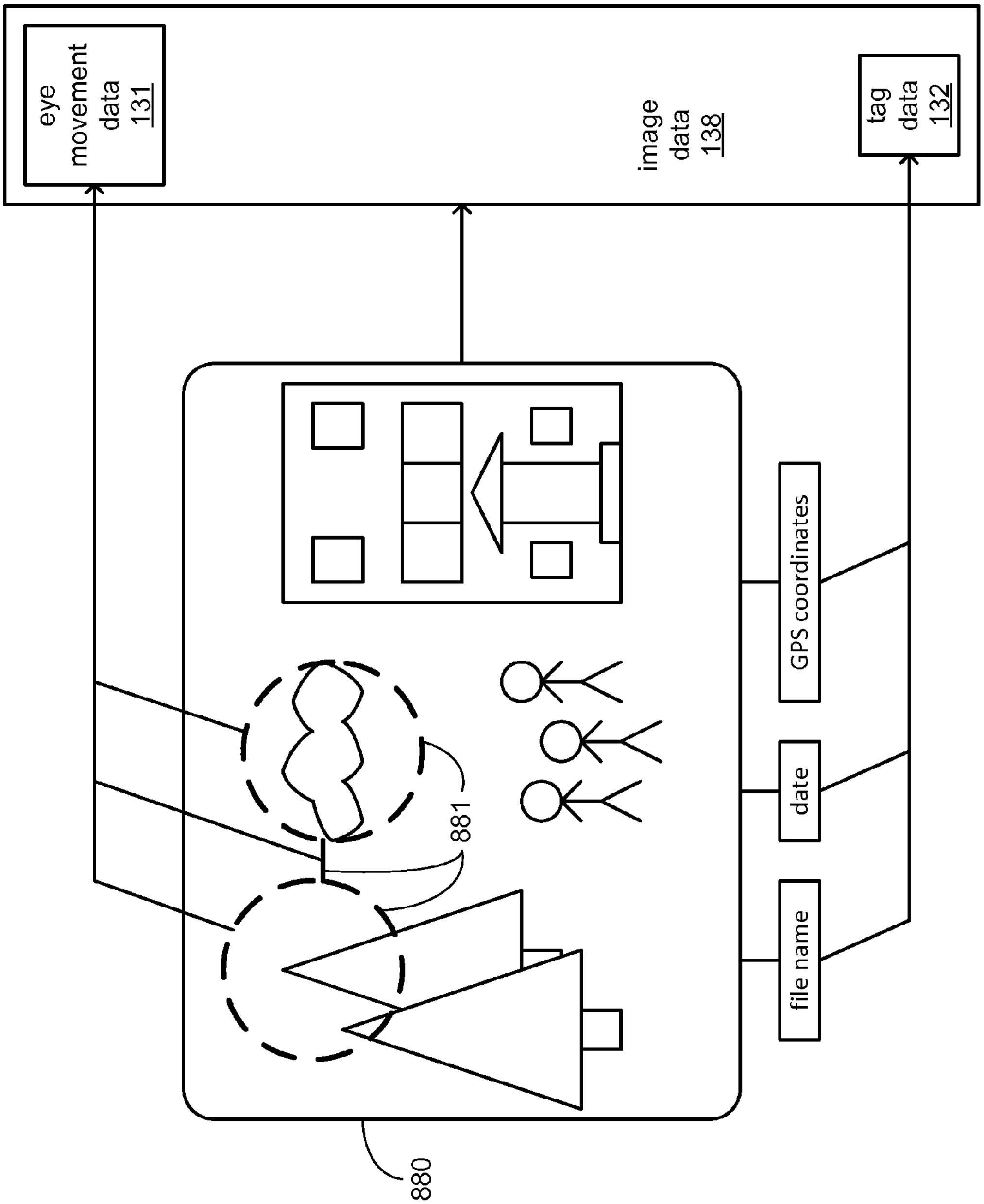
FIG. 2 illustrates aspects of processing performed in the embodiment of FIG. 1.

FIG. 2 depicts an example image 880 captured by the camera 110 of the capture device 100. Highlighted with dashed circles is an example of a pair of focus regions, and highlighted with a short segment extending between the circles is the occurrence of a high proportion of saccades 881 occurring between those two focus regions. As depicted, one of the focus regions is centered on an image of a top of a fir tree, and another is centered on an image of a cloud. Each fixation typically covers an area of an image that corresponds to about two degrees of movement around the center of the fixation. As a result, the area of an image that is covered by a single fixation varies in its size with distance from a human eye. A focus region comprises numerous fixations that are closely spaced, but many of which do not completely overlap, and thus, the area of an image that is covered by a focus region tends to be somewhat wider than that of a single fixation.

As also depicted in FIG. 2, as the image 880 is captured by the camera 110, it is stored as the image data 138, which also comprises an eye movement data 131 and a tag data 132. Typically, a person operating a camera will delay operating a control to cause capturing of an image to occur until that person clearly sees the image, themselves, well enough to refine their aiming of the camera. This typically provides an opportunity for the eye tracker 181 to track eye movements of at least one of the person's eyes to capture their eye movements prior to their operating the controls 120 to capture an image. The processor circuit 150 is caused to respond to such operation of the controls 120 by capturing indications of the eye movement observed via the eye tracker 181 to have occurred immediately preceding the time at which the controls 120 were so operated. Further, if that person then subsequently views the now captured image on the display 180, the eye tracker 181 may again be operated by the processor circuit 150 to capture indications of their eye movements.

Although the eye tracker 181 may be based on any of a variety of technologies, it is envisioned that at least some implementations of the eye tracker 181 detect the direction in which the gaze of at least one eye at a recurring interval (perhaps coincident with or a multiple of the refresh rate of the display 180). With each such interval, a gaze point (e.g., a point on the display 180 at which that eye is gazing) is determined, and thus, the eye movement data 131 may comprise a series of such gaze points at such a temporal interval. In analyzing these gaze points, where a series of gaze points indicates a gaze remaining at substantially the same location on the display 180 (possibly for at least a selected period of time used to identify fixations), a fixation may be determined to have occurred at that point. Where a series of gaze points show the location at which the eye gazes on the display as moving between adjacent gaze points, a saccade may be determined to have occurred through those gaze points. It may be that the processor 150 is caused to analyze these gaze points and determine where fixations and saccades have occurred, and then store those as the eye movement data 131, possibly in lieu of storing gaze points as the eye movement data 131. Alternatively, the eye movement data 131 may comprise gaze points, and it may be the processor 350 of the server 300 that determine where fixations and saccades have occurred.

The tag data 132 may comprise one or more of text entered by the operator via the controls 120 to manually provide a textual description of the image 880, a timestamp possibly including both date and time at which the image 880 was captured, and/or GPS coordinates (or other location information) of the place at which the image 880 was captured. Of the text that may be manually entered by the operator, the text may be a title that the operator gives the image 880, a description comprising one or more sentences, key words, and/or the name of a file comprising the image data 138.

Returning to FIG. 1, having captured and stored the image 880 as the image data 138, along with the eye movement data 131 and the tag data 132, the processor circuit 150 is further caused to signal the server 300 via the network 999 to convey the image data 138 to the server 300 via the network 999 for storage by the server 300. Depending on the accessibility of the network 999 to the capture device 100 and/or the preferences of its operator, such signaling of the server 300 may occur relatively immediately following image capture, or may occur at a later time of the operator's choosing. Further, it may be that the operator first copies the image data 138 to another computing device in the possession of the operator (not shown), possibly to allow the operator to view and evaluate the image 880 on that other computing device before deciding to transmit it to the server 300.

In various embodiments, the server 300 comprises a processor circuit 350; an interface 390 coupling the server 300 to the network 999; and a storage 360 storing one or more of a control routine 340, the image data 138, an image database 330, an eye movement data 531 and a tag data 532. The image database 330 comprises an index 335 and numerous pieces of image data 338*a* through 338*x* that each comprise an image. In executing a sequence of instructions of at least the control routine 340, the processor circuit 350 is caused to operate the interface 390 to receive the aforementioned signal from the capture device 100 conveying the image data 138 (including the eye movement data 131 and the tag data 132) to the server 300.

Upon receipt of the image data 138, the processor circuit 350 is caused to store the image 880 of the image data 138 in the image database 330 as one of the image data 338*a* through 338*x*, and is caused to augment the index 335 with the tag data 132. The processor circuit 350 also employs various visual recognition algorithms to identify objects depicted in the image 880 at the locations of the focus regions either indicated directly by the eye movement data 131 or derived by the processor circuit 350 from the eye movement data 131. The processor circuit 350 then augments the index 335 with indications of those identified objects. The server 300 further augments the index 335 with indications of possible relationships among objects within pairs of focus regions between which high proportions of saccades have occurred. The server 300 yet further augments the index 335 with indications of possible spatial relationships of focus regions (or the objects identified at focus regions) with one or more fixations between which a high proportion of saccades have been found to have occurred. It may be that the processor circuit 350 is caused to employ one or more visual recognition algorithms to perform some limited degree of identification of objects at such fixations. Alternatively or additionally, the server 300 augments the index 335 with data indicating the pattern of eye movements (possibly gaze points) observed by an eye tracker (e.g., the eye tracker 181).

It should be noted that the objects identified as located at focus regions may be any of a wide variety of types of objects. These objects may comprise simple lines or shapes or colors located at a focus region. Alternatively or additionally, these objects may comprise identified physical objects, such as without limitation, people, buildings, plants, furniture, vehicles, etc. Still further, these objects may comprise derived histograms of gradients of color(s), directions of detected lines, aspects of depicted textures, etc.

It should be noted that although the image database 330 is depicted and discussed herein as having the index 335 separate and distinct from the image data 338*a-x*, this is but one possible organization of elements within a database, as those skilled in the art of database organization will readily recognize. For example, as an alternative, the contents of the index 335 may be distributed among the image data 338*a-x* such that, similar to the image data 138, each of the image data 338*a-x* comprises tags, eye movement data indicating fixations and saccades, and/or other information operative to serve as bases for searching for images among the image data 338*a-x*.

In various embodiments, the viewing device 500 comprises a processor circuit 550, a display 580, an eye tracker 581, controls 520, an interface 590 coupling the viewing device 500 to the network 999, and a storage 560 storing a control routine 540 and one or more of the image data 338*a-x*, eye movement data 531 and tag data 532. In executing a sequence of instructions of at least the control routine 540, the processor circuit 550 is caused to monitor the controls 520 to enable an operator of the viewing device 500 to operate the controls 520 to signal the processor circuit 550 with a command to signal the server 300 to search for an image.

The operator may initially begin the search by operating the controls 520 to manually enter text or to otherwise select of specify text that specifies an object of which the operator desires to find an image. The processor circuit 550 is caused to store that text as the tag data 532, and is then caused to operate the interface 590 to send the tag data 532 to the server 300 via the network 999. In response to receiving the tag data 532, the processor circuit 350 of the server 300 is caused to employ the index 335 in searching the image database 330. From the image database 330, the processor circuit 350 retrieves a first subset of the image data 338*a-x* comprising a multitude of images tagged with information matching and/or related to the search text of the tag data 532. The processor circuit 350 is then caused to operate the interface 390 to transmit this first subset of the image data 338*a-x* via the network 999 to the viewing device 500.

Upon receipt of this first subset of the image data 338*a-x*, the processor circuit 550 of the viewing device 500 is caused to display the images of that first subset on the display 580, allowing the operator of the viewing device 500 to view them. As the operator views these images, eye movements of at least one of their eyes are monitored by the eye tracker 581, enabling their fixations and saccades occurring on each of the images they view to be determined, and ultimately enabling focus regions and/or where higher proportions of saccades have occurred from which relationships might be inferred. It may that the eye movement data 531 comprises little more than gaze points indicating locations on the display 580 at which the monitored eye has been determined to be gazing at a recurring interval. Alternatively or additionally, the processor circuit 550 may be caused by the control program 540 to determine the locations of fixations and saccades from the observed movements of the monitored eye, and to store those fixations and saccades as part of the eye movement data 531. Yet again, alternatively or additionally, the processor circuit 550 may be caused to derive focus regions and/or where there are saccades occurring in higher proportions between focus regions. Regardless of the eye movement data 531 exactly comprises, the processor circuit 550 is then caused to transmit the eye movement data 531 to the server 300, thereby providing the server with indications of which one(s) of the images of the first subset of the image data 338*a-x* are the image(s) in which fixations, saccades, focus regions, etc. have occurred that provide an indication of objects of interest to the viewer in those images.

Regardless of the exact nature of the data of which the eye movement data 531 is composed, if there is an indication in the eye movement data 531 of one or more focus regions occurring at locations in those images at which focus regions had been previously identified, then the processor circuit 350 is caused to employ this information of the eye movement data 531 to retrieve indications from tag data within the index 335 identifying what objects are at those locations. The processor circuit 350 is then caused to use this information concerning the identities of those objects at those locations to search for additional images within the image database 330 that depict matching or related objects. The processor circuit 350 then operates the interface 390 to transmit a second subset of the image data 338*a-x* that comprises those additional images to the viewing device 500. Upon receiving the second subset of the image data 338*a-x* comprising the additional images, the processing device 550 is caused to display those additional images on the display 580, either in addition to or in lieu of the images of the first subset of the image data 338*a-x*.

However, if the eye movement data 531 provides indications of focus regions occurring at locations in those images at which focus regions had not been previously identified, then the processor circuit 350 is caused to employ various visual recognition algorithms to identify the objects depicted at those focus regions, and to augment the index 335 with indications of what those objects at those focus regions are. The processor circuit 350 is then caused to use this information concerning these newly identified objects to search for additional images within the image database 330 that depict matching or related objects. The processor circuit 350 then operates the interface 390 to transmit a second subset of the image data 338*a-x* that comprises those additional images to the viewing device 500 where the additional images can be viewed by the operator of the viewing device 500. Thus, the mere viewing of images of the image database 330, over time and by numerous people, results in the index 335 being improved over time so that desired images already in the image database 330 may be found more readily by others in subsequent searches.

Still further, various pieces of tag information in the index 335 for each image may be revised over time to adjust weighting values assigned to different pieces of tag information and/or to correct errant tag information. By way of example, where a search is underway for images depicting a table, one image may be included in a subset of the image data 338*a-x* that is sent to the viewing device 500 that may actually depict a different object somehow misidentified as a table. The eye movement data 531 may provide an indication of the person viewing the images on the viewing device 500 viewing the image with the misidentified object in some manner that indicates very different eye movements from the other images, and this difference may be such that it calls the identification of that object as a table into doubt (e.g., the person views the image, but not in a way that leaves a focus region where the misidentified table is). In response, the processor circuit 550 may be caused to employ a weighting value on the tag that identifies the image as having a table that lowers that tag in prominence, or otherwise indicates there is some doubt as to how useful that tag is. Over time, as other persons seeking to view images of tables have similar reactions (as demonstrated by the manner in which they view the images), the same tag misidentifying the object in that image as a table may be so reduced in its weighting that it is finally eliminated from the index 335.

As an alternative to the operator beginning their search for an image with manual entry and/or selection of text to initially employ a text search, the operator may begin by manually selecting and viewing one or more images from among the images stored within the image database 330. The processor circuit 350 may transmit subsets of the image data 338*a-x* that comprise images grouped by various characteristics that they are found to have in common as indicated by tags maintained in the index 335 (e.g., images captured in the same month or year, images captured by the same person, images of the same place, etc.) to the viewing device 500. The processor circuit 550 may present these groups of images on the display 580 in random order in two-dimensional grids, or in other ways enabling the operator to quickly select and begin viewing images. Again, as the operator views one or more of the images in these presented groups, eye movements of at least one of their eyes are monitored to gather eye movement data leading to determinations of fixations, saccades, focus regions, etc. used to find images depicting similar or related objects.

It should also be noted that where eye movement data received by the server 300 (e.g., the eye movement data 131 of the image data 138, or the eye movement data 531) comprises such "raw" data concerning eye movements as gaze points, etc., the processor circuit 350 may be caused to augment the index 335 with such "raw" data as part of storing indications of patterns of eye movements in viewing images. It may be (either in addition to or in lieu of other search methods based on focus regions and saccades) that searches for images includes identifying images with similar eye movement patterns of persons viewing them. In such cases, it may be that objects at the locations of focus regions are not identified, though the occurrence and locations of focus regions may still be as part of comparing patterns of eye movement.

In various embodiments, each of the processor circuits 150, 350 and 550 may comprise any of a wide variety of commercially available processors, including without limitation, an AMD® Athlon®, Duron® or Opteron® processor; an ARM® application, embedded or secure processor; an IBM® and/or Motorola® DragonBall® or PowerPC® processor; an IBM and/or Sony® Cell processor; or an Intel® Celeron®, Core (2) Duo®, Core (2) Quad®, Core i3®, Core i5®, Core i7®, Atom®, Itanium®, Pentium®, Xeon® or XScale® processor. Further, one or more of these processor circuits may comprise a multi-core processor (whether the multiple cores coexist on the same or separate dies), and/or a multi-processor architecture of some other variety by which multiple physically separate processors are in some way linked.

In various embodiments, each of the storages 160, 360 and 560 may be based on any of a wide variety of information storage technologies, possibly including volatile technologies requiring the uninterrupted provision of electric power, and possibly including technologies entailing the use of machine-readable storage media that may or may not be removable. Thus, each of these storages may comprise any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may comprise multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, each of the interfaces 190, 390 and 590 employ any of a wide variety of signaling technologies enabling each of computing devices 100, 300 and 500 to be coupled through the network 999 as has been described. Each of these interfaces comprises circuitry providing at least some of the requisite functionality to enable such coupling. However, each of these interfaces may also be at least partially implemented with sequences of instructions executed by corresponding ones of the processor circuits 150, 350, and 550 (e.g., to implement a protocol stack or other features). Where one or more portions of the network 999 employs electrically and/or optically conductive cabling, corresponding ones of the interfaces 190, 390 and 590 may employ signaling and/or protocols conforming to any of a variety of industry standards, including without limitation, RS-232C, RS-422, USB, Ethernet (IEEE-802.3) or IEEE-1394. Alternatively or additionally, where one or more portions of the network 999 entails the use of wireless signal transmission, corresponding ones of the interfaces 190, 390 and 590 may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc. It should be noted that although each of the interfaces 190, 390 and 590 are depicted as a single block, one or more of these may comprise multiple interfaces that may be based on differing signaling technologies. This may be the case especially where one or more of these interfaces couples corresponding ones of the computing devices 100, 300 and 500 to more than one network, each employing differing communications technologies.

In various embodiments, each of the controls 120 and 520 may comprise any of a variety of types of manually-operable controls, including without limitation, lever, rocker, pushbutton or other types of switches; rotary, sliding or other types of variable controls; touch sensors, proximity sensors, heat sensors or bioelectric sensors, etc. Each of the controls 120 and 520 may comprise manually-operable controls disposed upon a casing of corresponding ones of the computing devices 100 and 500, and/or may comprise manually-operable controls disposed on a separate casing of a physically separate component of corresponding ones of these computing devices (e.g., a remote control coupled to other components via infrared signaling). Alternatively or additionally, the controls 120 and 520 may comprise any of a variety of non-tactile user input components, including without limitation, a microphone by which sounds may be detected to enable recognition of a verbal command; a camera through which a face or facial expression may be recognized; an accelerometer by which direction, speed, force, acceleration and/or other characteristics of movement may be detected to enable recognition of a gesture; etc.

In various embodiments, each of the displays 180 and 580 may be based on any of a variety of display technologies, including without limitation, a liquid crystal display (LCD), including touch-sensitive, color, and thin-film transistor (TFT) LCD; a plasma display; a light emitting diode (LED) display; an organic light emitting diode (OLED) display; a cathode ray tube (CRT) display, three-dimensional projection, augmented reality, etc. Each of these displays may be disposed on a casing of corresponding ones of the computing devices 100 and 500, or may be disposed on a separate casing of a physically separate component of corresponding ones of these computing devices (e.g., a flat panel monitor coupled to other components via cabling).

Figure 3:
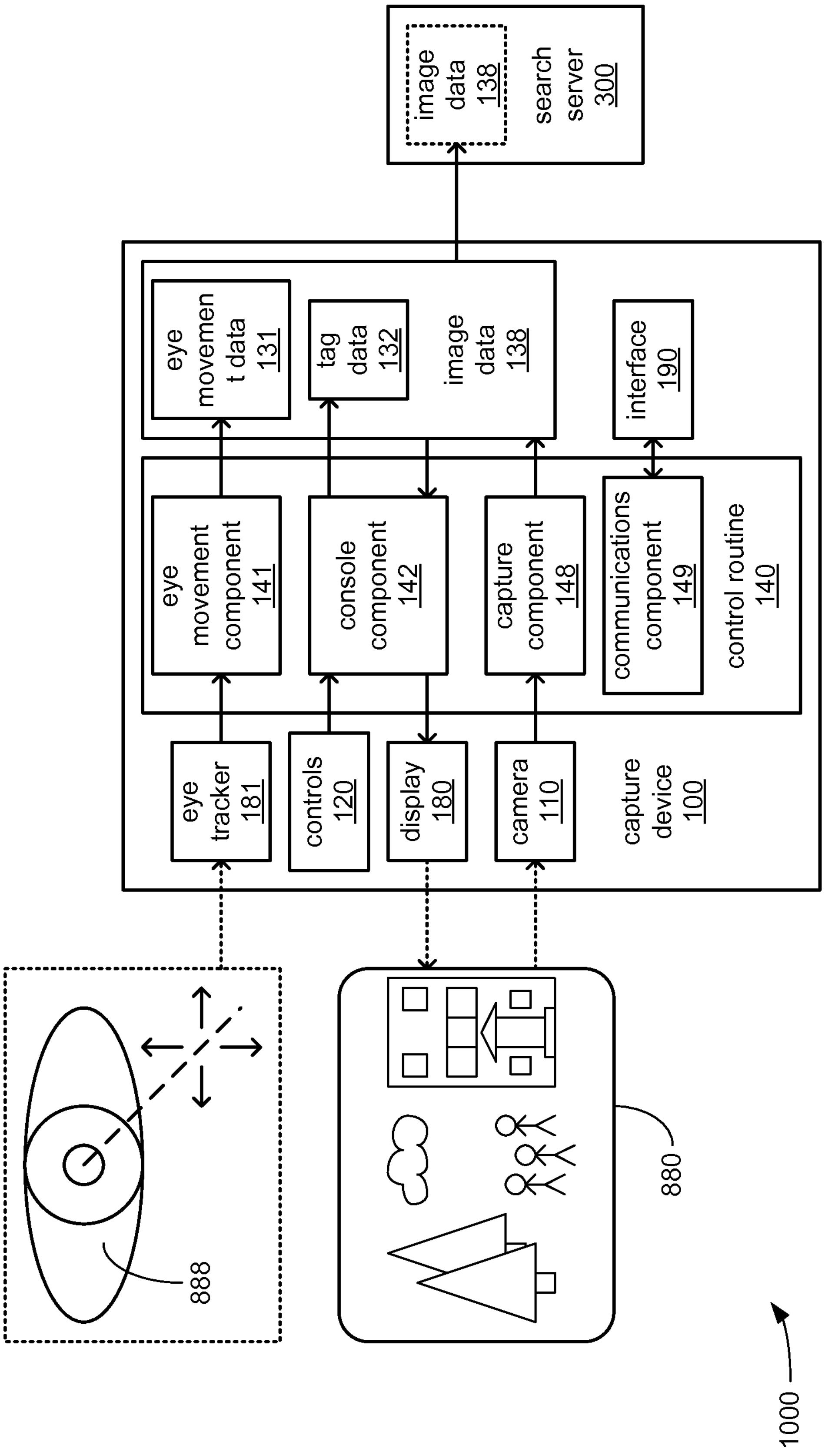
FIG. 3 illustrates a portion of the embodiment of FIG. 1.
Figure 4:
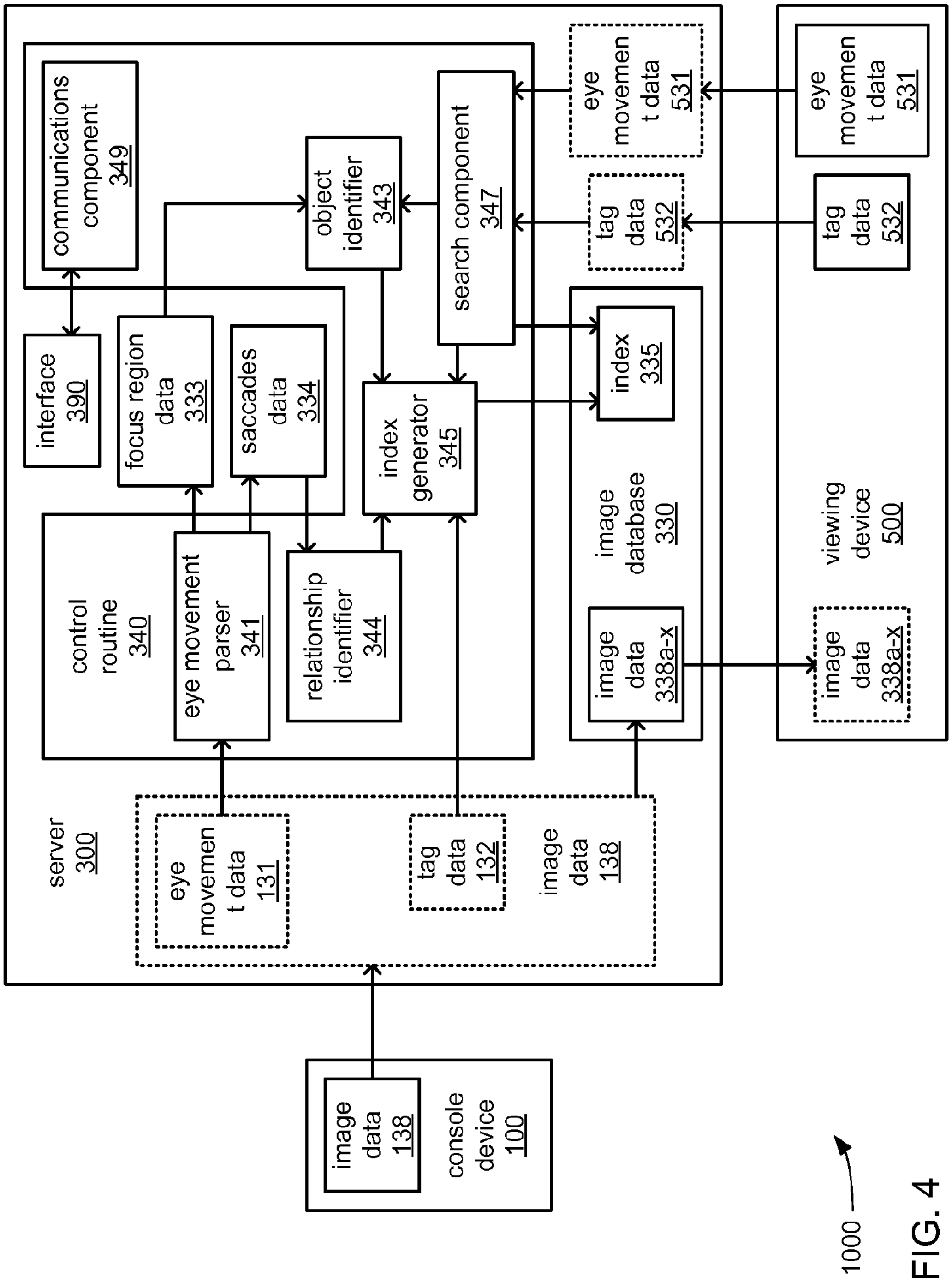
FIG. 4 illustrates a portion of the embodiment of FIG. 1.
Figure 5:
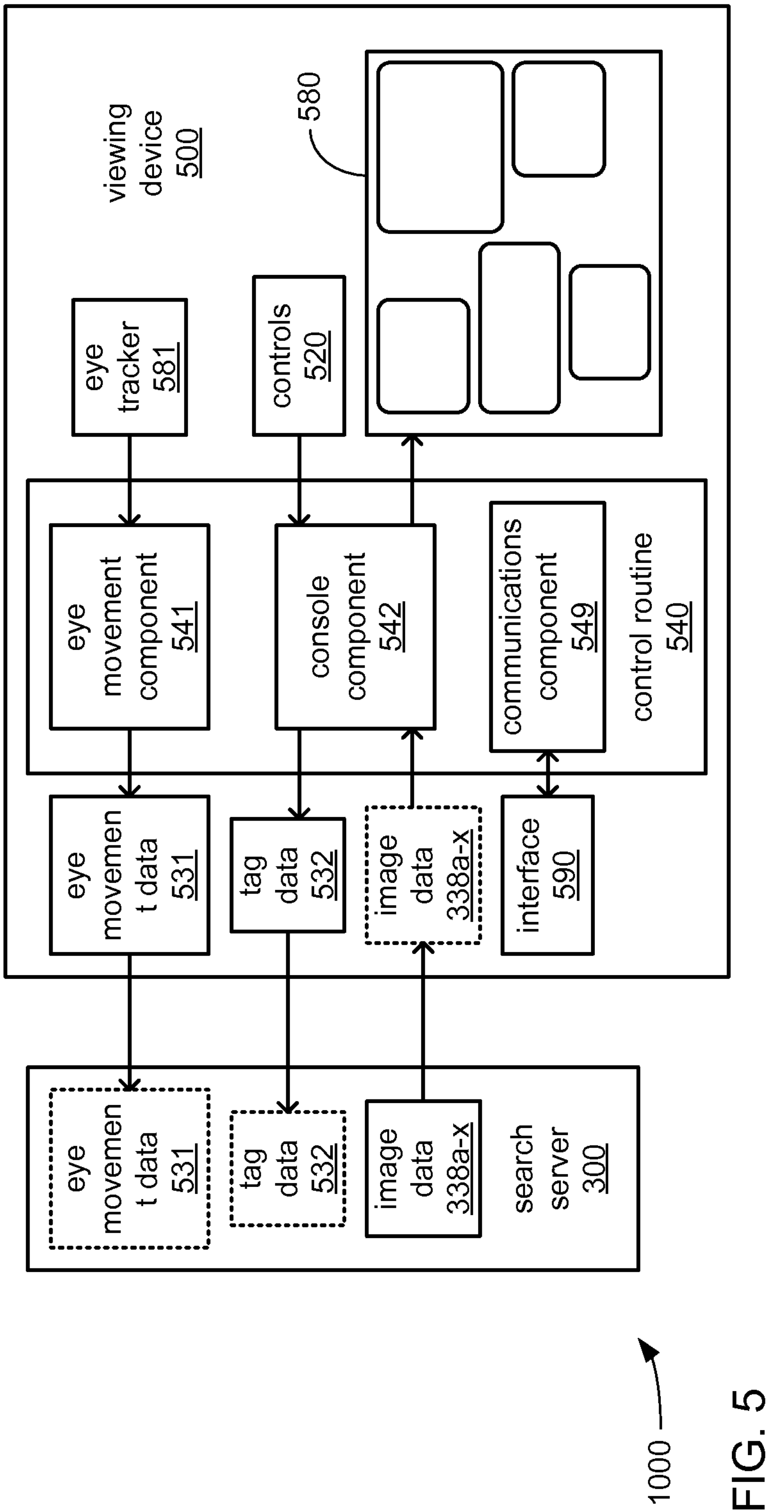
FIG. 5 illustrates a portion of the embodiment of FIG. 1.

FIGS. 3, 4 and 5, taken together, illustrate block diagrams of portions of the block diagram of FIG. 1 depicted in greater detail. More specifically, aspects of the operating environments of the capture device 100, the server 300 and the viewing device 500 are depicted, in which their respective processor circuits 150, 350 and 550 (FIG. 1) are caused by execution of their respective control routines 140, 340 and 540 to perform the aforedescribed functions. As will be recognized by those skilled in the art, each of the control routines 140, 340 and 540, including the components of which each is composed, are selected to be operative on whatever type of processor or processors that are selected to implement each of the processor circuits 150, 350 and 550.

In various embodiments, one or more of the control routines 140, 340 and 540 may comprise a combination of an operating system, device drivers and/or application-level routines (e.g., so-called "software suites" provided on disc media, "applets" obtained from a remote server, etc.). Where an operating system is included, the operating system may be any of a variety of available operating systems appropriate for whatever corresponding ones of the processor circuits 150, 350 and 550, including without limitation, Windows™, OS X™, Linux®, or Android OS™. Where one or more device drivers are included, those device drivers may provide support for any of a variety of other components, whether hardware or software components, that comprise one or more of the computing devices 100 300 and 500.

Each of the control routines 140, 340 and 540 comprises a communications component 149, 349 and 549, respectively, executable by corresponding ones of the processing circuits 150, 350 and 550 to operate corresponding ones of the interfaces 190, 390 and 590 to transmit and receive signals via the network 999 as has been described. As will be recognized by those skilled in the art, each of the communications components 149, 349 and 549 are selected to be operable with whatever type of interface technology is selected to implement each of the interfaces 190, 390 and 590.

Turning more specifically to FIGS. 3 and 5, the control routines 140 and 540 comprise a console component 142 and 542, respectively, executable by the processing circuits 150 and 550 to provide user interfaces by which images are visually presented on corresponding ones of the displays 180 and 580, and possibly by which manual entry or other mechanism of selecting text (or still other mechanism for reception of input) is supported via corresponding ones of the controls 120 and 520. Under control of the console component 142, the processor circuit 150 is caused to visually present on the display 180 an image of what is in the view of the camera 110 as part of providing an electronic equivalent of a camera eyepiece for an operator of the capture device 100 to use in aiming the camera 110 to capture an image (e.g., the image 880 depicted in FIG. 3). The processor circuit 150 is also caused to monitor the controls 120 for an indication of their being operated to cause image capture to take place. Following capture and storage of an image as the image data 138, the processor circuit 150 may be further caused to continue to visually present that image on the display 180 for further review by the operator of the capture device 100. Still further, the processor circuit 150 may also monitor the controls 120 for indications of being operated to manually input or select descriptive text and/or other text associated with the captured image that the processor circuit 150 is caused to store as the tag data 132.

Under control of the console component 542, the processor circuit 550 is caused to visually present on the display 580 images taken from one or more subsets of the image data 338*a-x* received by the viewing device 500 from the server 300 as part of enabling the operator of the viewing device 500 to search for an image of a particular object of interest to them. These images may be visually presented on the display 580 in any of a variety of ways, including individually, in a single-file horizontal or vertical scrolling fashion, or in a tiled group (possibly as depicted in FIG. 5) to enable speedy selection for viewing. Further, the processor circuit 550 may also monitor the controls 550 for indications of their being operated to manually input or otherwise select search text that the processor circuit 550 is caused to store as the tag data 532.

The control routines 140 and 540 comprise an eye movement component 141 and 541, respectively, executable by the processing circuits 150 and 550 to monitor eye movements of an eye (e.g., the eye 888 depicted in FIG. 3) gazing at various locations on corresponding ones of the displays 180 and 580, using corresponding ones of the eye trackers 181 and 581. Under control of the eye component 141, the processor circuit 150 is caused to operate the eye tracker 181 to detect eye movement of an eye of an operator of the capture device 100 during visual presentation of what is in the view of the camera 110 on the display 180 leading up to capture of the image 880, and to then store indications of those eye movements as the eye movement data 131. Under control of the eye component 541, the processor circuit 550 is caused to operate the eye tracker 581 to detect eye movement of an eye of an operator of the viewing device 500 during viewing the visual presentation of images of subsets of the image data 338*a-x* on the display 580, and to then store indications of that eye movement as the eye movement data 531.

The control routine 140 comprises a capture component 148 executable by the processor circuit 150 to perform the capturing of an image of what is in the view of the camera 110, as has been described at length.

Turning more specifically to FIG. 4, the control routine 340 comprises an eye movement parser 341 executable by the processor circuit 350 to separate information concerning focus regions from saccades in received eye movement data (e.g., the eye movement data 131). The eye parser further causes the processor circuit 350 to separately store the indications of focus regions and saccades as the focus region data 333 and the saccades data 334, respectively.

The control routine 340 comprises an object identifier 343 and a relationship identifier 344 to examine the focus region data 333 and the saccades data 334 to derive information associated with an image to be added to the index 335. The object identifier comprises implementations one or more visual recognition algorithms to identify objects at the locations of the focus regions in an image indicated by the fixation data 333 (whether those objects are simpler objects such as lines and shapes, or more complex objects such as houses and people). The relationship identifier 344 parses the saccades data 334 to detect possible relationships between objects that exist in pairs of focus regions linked by high proportions of saccades occurring therebetween (whether directly or through one or more fixation points).

The control routine 340 comprises an index generator 345 executable by the processor circuit 350 to create entries in the index 335 for newly added images, and to augment the index 335 with information concerning objects identified at locations of focus regions, information concerning possible relationships between objects suggested by high proportions of saccades, and information concerning any tags (textual or otherwise) in received tag data (e.g., the tag data 132).

The control routine 340 comprises a search component 347 executable by the processor circuit 350 to examine the index 335 as part of using either received tag data conveying search text (e.g., the tag data 532) or indications of eye movement of a person viewing images provided by the server 300 (e.g., the eye movement data 531). The search component incorporates various implementations of text search and other algorithms to perform searches of the index 335 based on text or other types of tag information. Where eye movement information is received, the processor circuit 350 is first caused to examine the index 335 to determine if the focus regions and saccades identified in the received eye information are already identified in the index 335. If so, then the search component 347 causes the processor circuit 350 to search the image database 330, using the index 335 to identify images depicting objects similar to or related to the object(s) identified at the focus regions identified in the received eye information. If not, then before such a search of the image database 330 is performed, the search component 347 first passes the location(s) of the newly identified focus regions to the object identifier 343 to identify objects at those newly identified focus regions and to cause the index 335 to be augmented with information concerning those newly identified objects.

Figure 6:
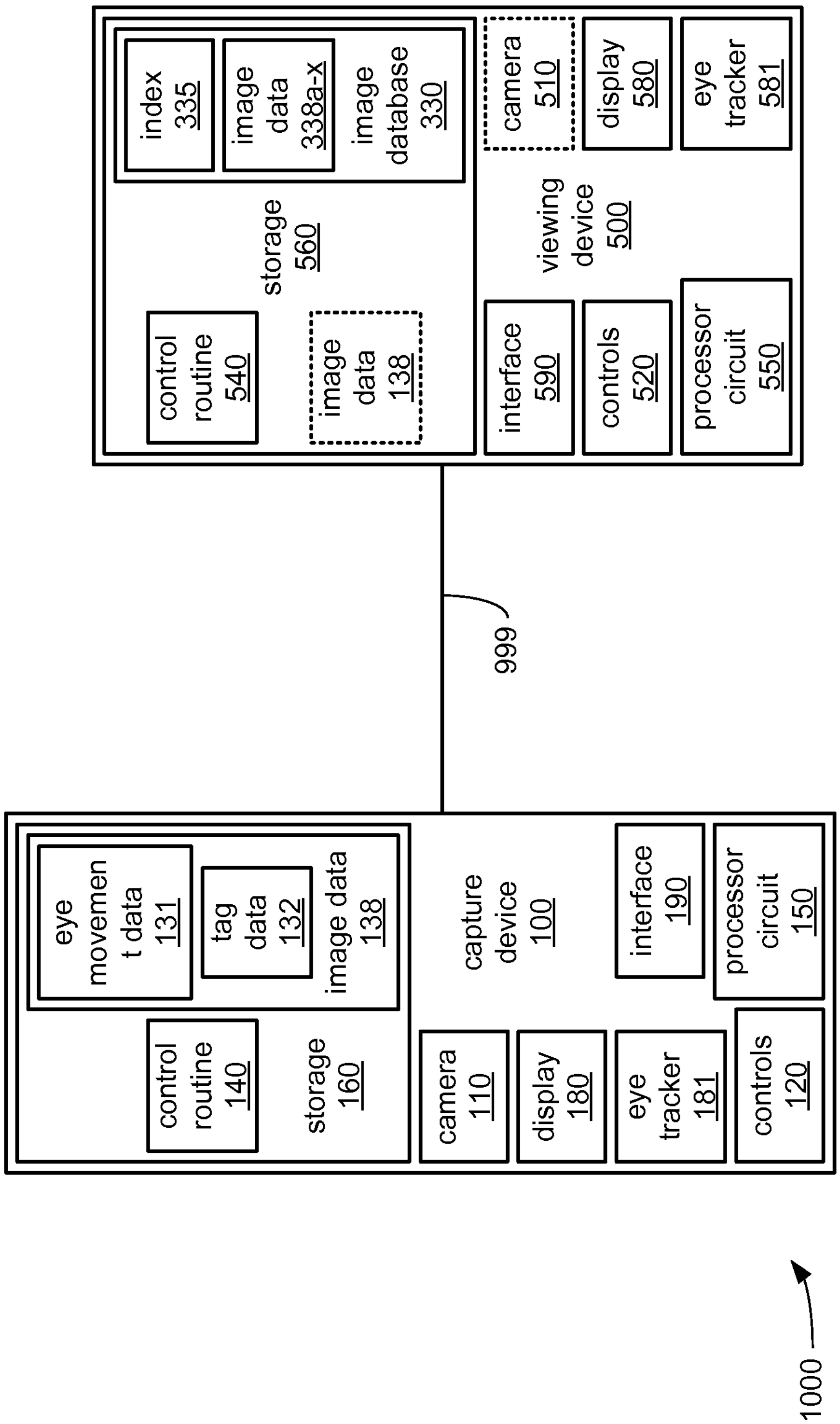
FIG. 6 illustrates a first embodiment of interaction among computing devices.

FIG. 6 illustrates a block diagram of a variation of the image storage and retrieval system 1000 of FIG. 1. This variation depicted in FIG. 6 is similar to what is depicted in FIG. 1 in many ways, and thus, like reference numerals are used to refer to like elements throughout. However, unlike the image storage and retrieval system 1000 depicted in FIG. 1, this variant of the image storage and retrieval system 1000 depicted in FIG. 6 includes a variant of the viewing device 500 that additionally assumes the database-related functions of the server 300. Thus, the capture device 100 transmits the image data 138 comprising the captured image 880 and associated eye movement data 131 and tag data 132 via the network 999 (either directly or through another computing device, not shown) to the viewing device 500, where the viewing device 500 maintains the image database 330. The use of eye movements in organizing, searching for and refining searches of images is substantially the same between these two variants of the image storage and retrieval system 1000.

It is envisioned that the image storage and retrieval system 1000 depicted in FIG. 1, with its separate and distinct server 300, is likely to be implemented as part of an image storage and search service on a network of an organization working with images, or on the Internet. In such a setting, it is envisioned that the server 300 is in the possession of and operated by a corporate, governmental, or other entity that is entirely unrelated to what are likely to be the person(s) who possess and use the capture device 100 and the viewing device 500 (possibly the same person). However, it is envisioned that the variant of the image storage and retrieval system 1000 of FIG. 6 might be implemented solely by one person in possession of both the capture device 100 and the viewing device 500, or may be implemented by members of a family.

Figure 7:
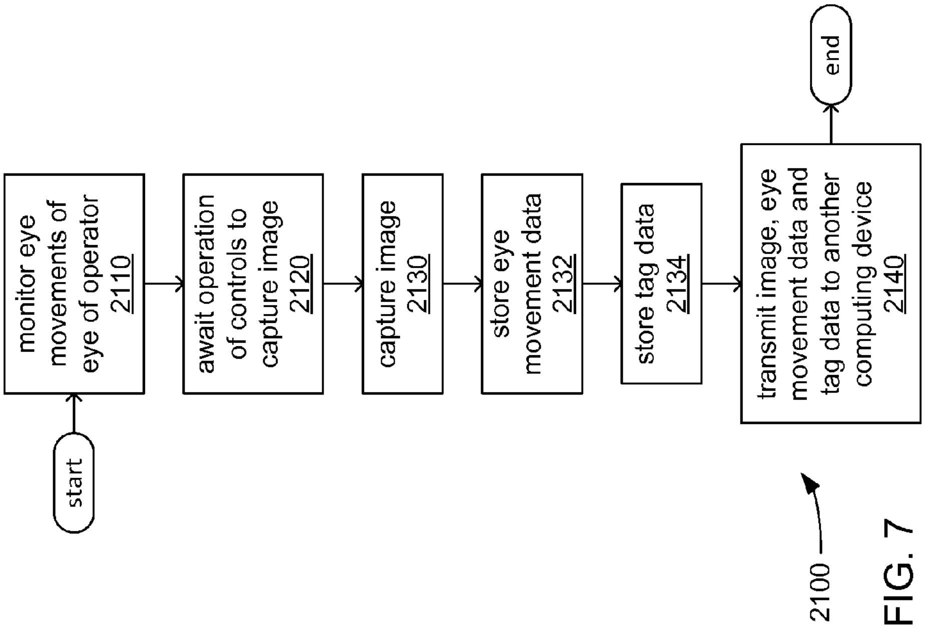
FIG. 7 illustrates an embodiment of a first logic flow.

FIG. 7 illustrates one embodiment of a logic flow 2100. The logic flow 2100 may be representative of some or all of the operations executed by one or more embodiments described herein. More specifically, the logic flow 2100 may illustrate operations performed by the processor circuit 150 of the capture device 100 in executing at least the control routine 140.

At 2110, a capture device (e.g., the capture device 100) monitors eye movements of an eye of a person operating it. As has been discussed, the eye movements monitored are of that eye viewing a display of the capture device (e.g., the display 180) as that display visually presents an image of whatever is in the view of a camera of the capture device (e.g., the camera 110) to enable the operator to aim the camera at whatever they select to capture an image of.

At 2120, the capture device awaits a signal indicating operation of its controls (e.g., the controls 120) conveying to it a command to capture an image of whatever is in the view of its camera.

At 2130, the capture device captures the image, storing it as image data.

At 2132, the capture device stores eye movement data describing eye movements of the eye of its operator throughout a specified period of time leading up to the operation of the controls that triggered the capturing of the image, and possibly afterwards as its operator possibly views the now captured image once again. Again, what exactly is stored as data describing eye movements may comprise gaze points detected by the eye tracker, fixations and/or saccades determined from analyzing what the eye tracker detected, and/or focus regions and indications of high proportions of saccades between focus regions or between a focus region and a fixation.

At 2134, the capture device stores any tag data either manually entered or otherwise selected by the operator (e.g., descriptive text) or automatically generated by the capture device (e.g., a timestamp, a date, GPS coordinates, etc.).

At 2140, the capture device transmits the image data, eye movement data and any tag data to another computing device (e.g., the server 300 or the variant of the viewing device 500 of FIG. 6).

Figure 8:
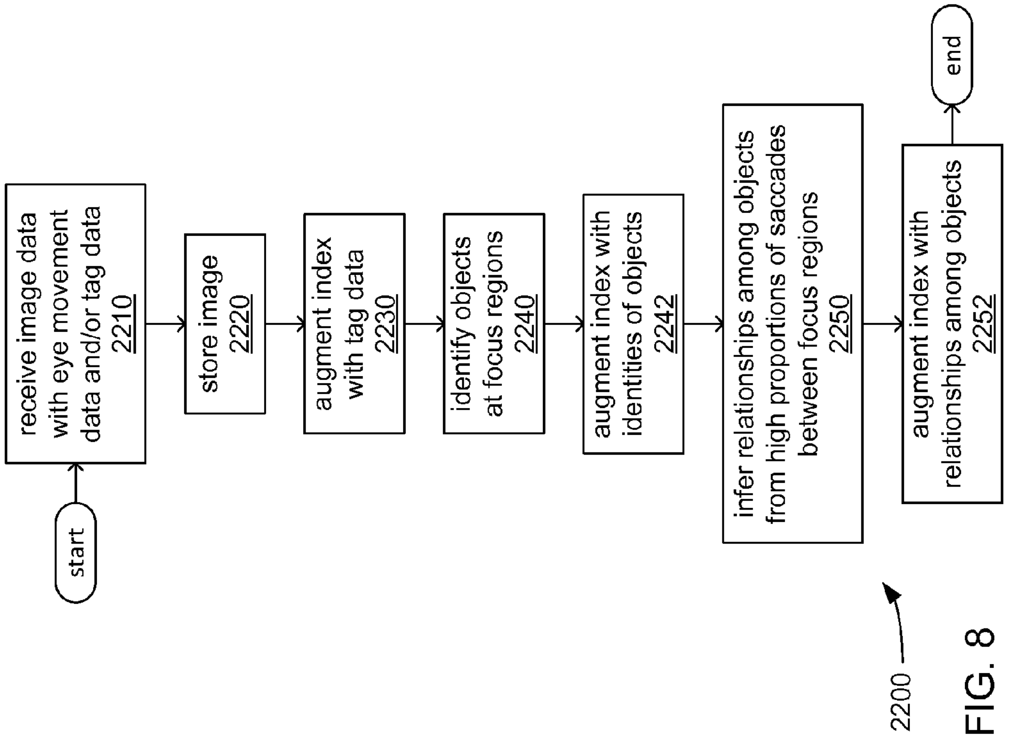
FIG. 8 illustrates an embodiment of a second logic flow.

FIG. 8 illustrates one embodiment of a logic flow 2200. The logic flow 2200 may be representative of some or all of the operations executed by one or more embodiments described herein. More specifically, the logic flow 2200 may illustrate operations performed by either of the processor circuit 350 of the server 300, or the processor circuit 550 of the variant of the viewing device 500 of FIG. 6.

At 2210, a computing device (e.g., the server 300 or the variant of the viewing device 500 of FIG. 6) receives image data comprising an image with eye movement data and/or tag data. Such receipt may be through a network shared with numerous devices, or a point-to-point link between the computing device and only one other device.

At 2220, the computing device stores the image in an image database (e.g., the image database 330). At 2230, the computing device augments the index of that image database with whatever tag data was received.

At 2240, the computing device identifies objects located at the focus regions identified by or derived from the received eye movement data, and then augments the index with indications of the identities of those objects at 2242.

At 2250, the computing device determines where high proportions of saccades occurred between focus regions identified in or derived from the received eye movement data to infer possible relationships among objects identified at those focus regions.

At 2252, the computing device augments the index with indications of these possible relationships among objects.

Figure 9:
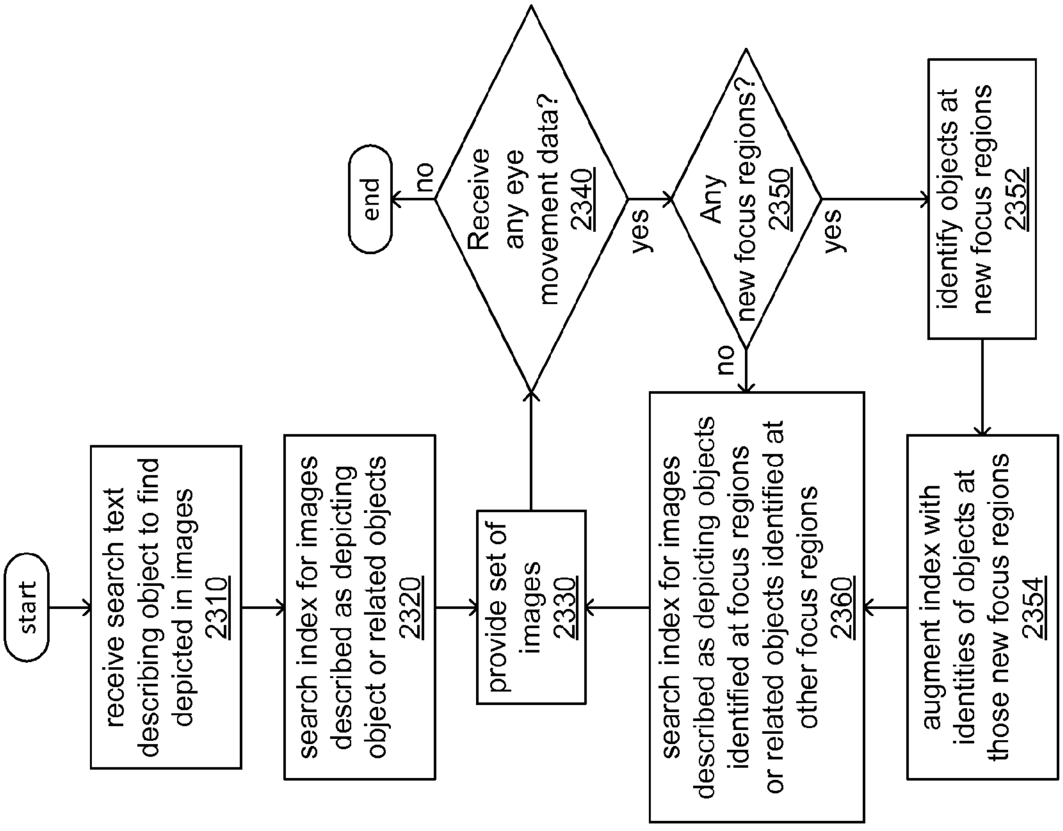
FIG. 9 illustrates an embodiment of a third logic flow.

FIG. 9 illustrates one embodiment of a logic flow 2300. The logic flow 2300 may be representative of some or all of the operations executed by one or more embodiments described herein. More specifically, the logic flow 2300 may illustrate operations performed by either of the processor circuit 350 of the server 300, or the processor circuit 550 of the variant of the viewing device 500 of FIG. 6.

At 2310, a computing device (e.g., the server 300 or the variant of the viewing device 500 of FIG. 6) receives search text describing an object for which a search of images is to be performed to find images depicting the object. Such receipt may be through a network or through manually operable controls of the computing device.

At 2320, the computing device searches an index of an image database (e.g., the image database 330) for images described in the index as depicting the object or other objects related to the object. At 2330, the computing device provides a set of images found in the image database that are so described. Such provision of images may be through a network or more directly through a display of the computing device.

At 2340, a check is made as to whether any eye movement data has been received providing indications of eye movements of an eye of a person viewing the provided images. If so, then at 2350, the computing device compares the focus regions of the received eye movement data to the index to determine if there are any focus regions indicated in the received eye movement data in the provided images that are not already identified in the index.

If no such new focus regions are identified in the received eye movement data, then at 2360, the computing device searches the index for images described in the index as depicting the objects identified as being at the focus regions indicated in the received eye movement data, as well as other objects related to those objects. Then, the computing device again provides a set of images found in the image data to depict such objects or such other related objects at 2330.

However, if at 2350, there are such new focus regions, then the computing device employs one or more visual recognition algorithms to identify the objects depicted at those new focus regions at 2352. The computing device then augments the index with indications of the identities of those newly identified objects at those new focus regions at 2354, before searching for images described in the index as depicting objects identified as being depicted at the focus regions indicated in the received eye movement data, as well as other objects related to those objects.

Figure 10:
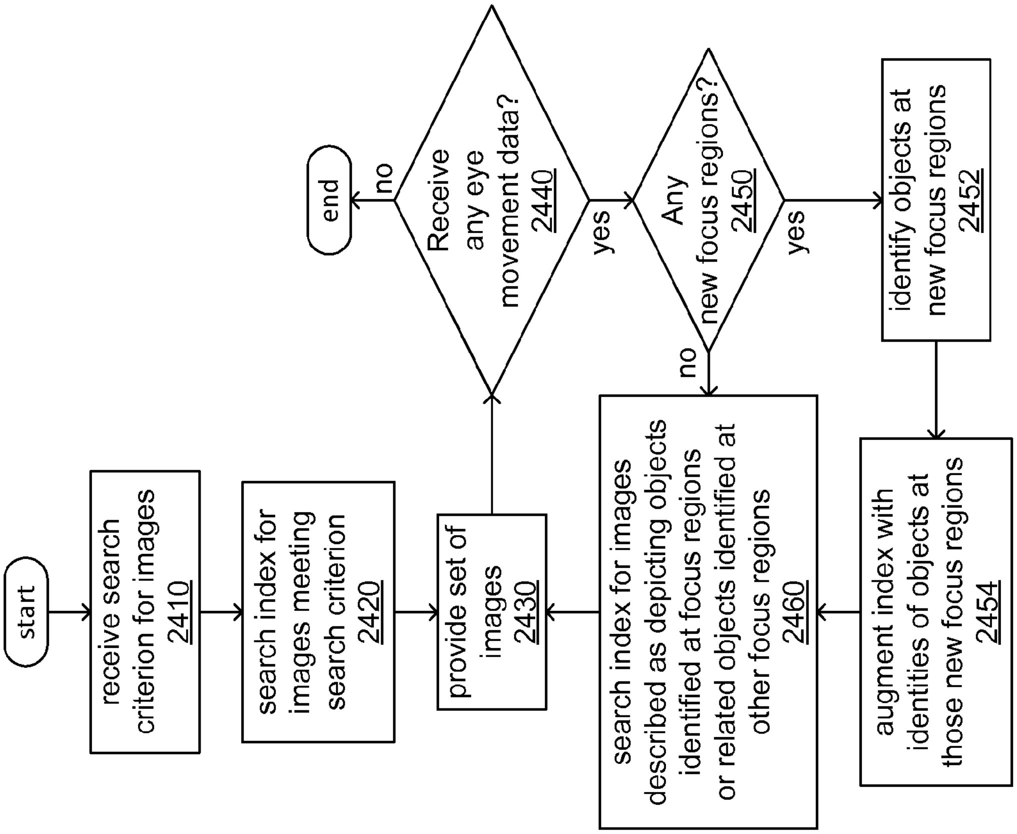
FIG. 10 illustrates an embodiment of a fourth logic flow.

FIG. 10 illustrates one embodiment of a logic flow 2400. The logic flow 2400 may be representative of some or all of the operations executed by one or more embodiments described herein. More specifically, the logic flow 2400 may illustrate operations performed by either of the processor circuit 350 of the server 300, or the processor circuit 550 of the variant of the viewing device 500 of FIG. 6.

At 2410, a computing device (e.g., the server 300 or the variant of the viewing device 500 of FIG. 6) receives search criterion to employ in searching for images other than an object specified as depicted in those images, such as without limitation, a geographic location at which the images were captured; or a date, an event, a season, etc. during which the images were captured. Such receipt may be through a network or through manually operable controls of the computing device.

At 2420, the computing device searches an index of an image database (e.g., the image database 330) for images having associated tag data in the index meeting the search criterion. At 2430, the computing device provides a set of images found in the image database that are so described. Such provision of images may be through a network or more directly through a display of the computing device.

At 2440, a check is made as to whether any eye movement data has been received providing indications of eye movements of an eye of a person viewing the provided images. If so, then at 2450, the computing device compares the focus regions of the received eye movement data to the index to determine if there are any focus regions indicated in the received eye movement data in the provided images that are not already identified in the index.

If no such new focus regions are indicated in the received eye movement data, then at 2460, the computing device searches the index for images described in the index as depicting the objects identified as being at the focus regions indicated in the received eye movement data, as well as other objects related to those objects. Then, the computing device again provides a set of images found in the image data to depict such objects or such other related objects at 2430.

However, if at 2450, there are such new focus regions, then the computing device employs one or more visual recognition algorithms to identify the objects depicted at those new focus regions at 2452. The computing device then augments the index with indications of the identities of those newly identified objects at those new focus regions at 2454, before searching for images described in the index as depicting objects identified as being depicted at the focus regions indicated in the received eye movement data, as well as other objects related to those objects.

Figure 11:
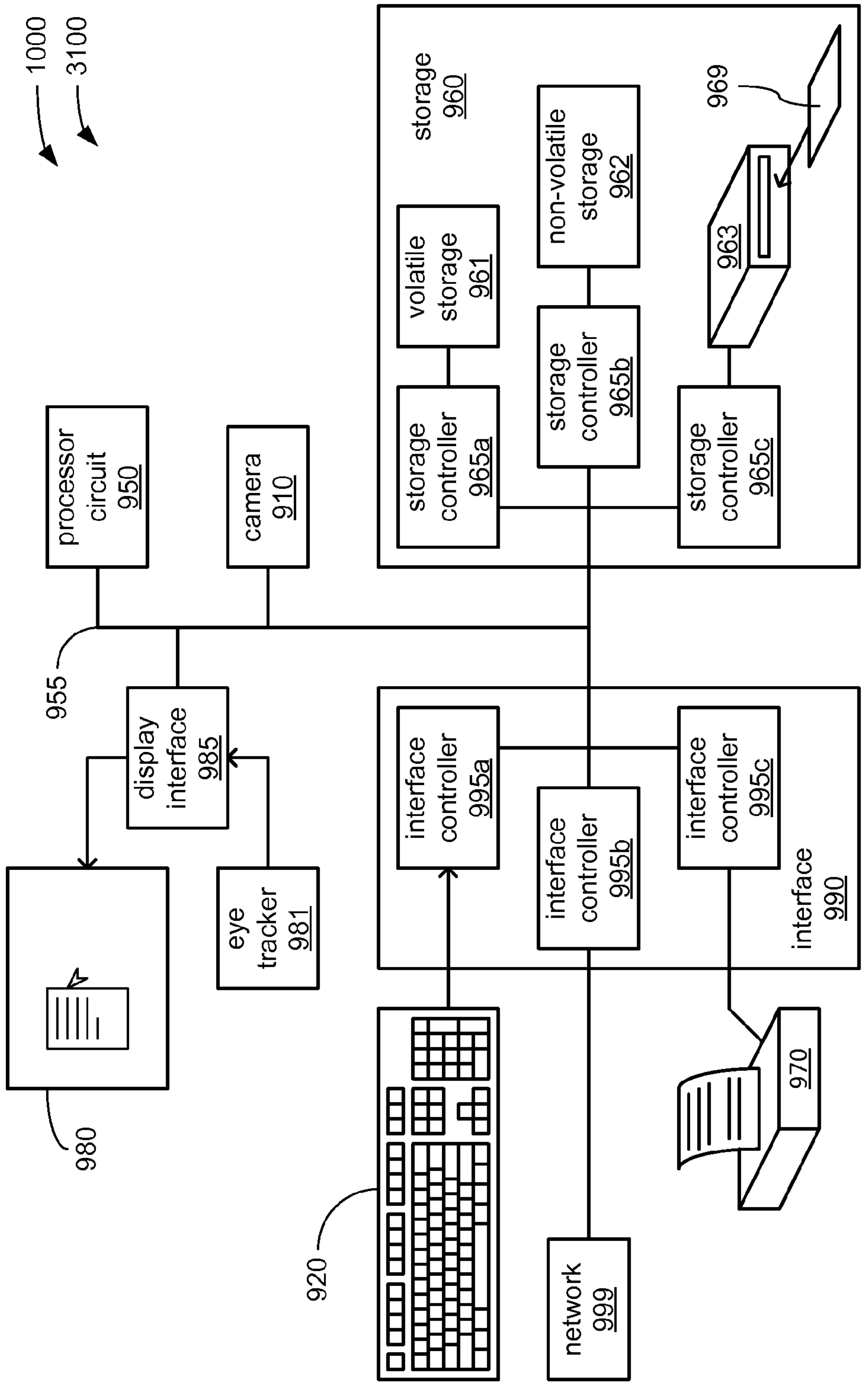
FIG. 11 illustrates an embodiment of a processing architecture.

FIG. 11 illustrates an embodiment of an exemplary processing architecture 3100 suitable for implementing various embodiments as previously described. More specifically, the processing architecture 3100 (or variants thereof) may be implemented as part of one or more of the computing devices 100, 300 and 500. It should be noted that components of the processing architecture 3100 are given reference numbers in which the last two digits correspond to the last two digits of reference numbers of components earlier depicted and described as part of each of the computing devices 100, 300 and 500. This is done as an aid to correlating such components of whichever ones of the computing devices 100, 300 and 500 may employ this exemplary processing architecture in various embodiments.

The processing architecture 3100 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor circuit, the processor circuit itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. Each message may be a signal or a plurality of signals transmitted either serially or substantially in parallel.

As depicted, in implementing the processing architecture 3100, a computing device comprises at least a processor circuit 950, a storage 960, an interface 990 to other devices, and coupling 955. As will be explained, depending on various aspects of a computing device implementing the processing architecture 3100, including its intended use and/or conditions of use, such a computing device may further comprise additional components, such as without limitation, a display interface 985 or a camera 910

The coupling 955 is comprised of one or more buses, point-to-point interconnects, transceivers, buffers, crosspoint switches, and/or other conductors and/or logic that communicatively couples at least the processor circuit 950 to the storage 960. The coupling 955 may further couple the processor circuit 950 to one or more of the interface 990 and the display interface 985 (depending on which of these and/or other components are also present). With the processor circuit 950 being so coupled by couplings 955, the processor circuit 950 is able to perform the various ones of the tasks described at length, above, for whichever ones of the computing devices 100, 300 and 500 implement the processing architecture 3100. The coupling 955 may be implemented with any of a variety of technologies or combinations of technologies by which signals are optically and/or electrically conveyed. Further, at least portions of couplings 955 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor circuit 950 (corresponding to one or more of the processor circuits 150, 350 and 550) may comprise any of a wide variety of commercially available processors, employing any of a wide variety of technologies and implemented with one or more cores physically combined in any of a number of ways.

As previously discussed, the storage 960 (corresponding to one or more of the storages 160, 360 and 560) may comprise one or more distinct storage devices based on any of a wide variety of technologies or combinations of technologies. More specifically, as depicted, the storage 960 may comprise one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as possibly comprising multiple distinct types of storage is in recognition of the commonplace use of more than one type of storage device in computing devices in which one type provides relatively rapid reading and writing capabilities enabling more rapid manipulation of data by the processor circuit 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 955 through a storage controller *965a* providing an appropriate interface to the volatile storage 961 that perhaps employs row and column addressing, and where the storage controller *965a* may perform row refreshing and/or other maintenance tasks to aid in preserving information stored within the volatile storage 961. By way of another example, where the non-volatile storage 962 is present and comprises one or more ferromagnetic and/or solid-state disk drives, the non-volatile storage 962 may be communicatively coupled to coupling 955 through a storage controller *965b* providing an appropriate interface to the non-volatile storage 962 that perhaps employs addressing of blocks of information and/or of cylinders and sectors. By way of still another example, where the removable media storage 963 is present and comprises one or more optical and/or solid-state disk drives employing one or more pieces of removable machine-readable storage media 969, the removable media storage 963 may be communicatively coupled to coupling 955 through a storage controller *965c* providing an appropriate interface to the removable media storage 963 that perhaps employs addressing of blocks of information, and where the storage controller *965c* may coordinate read, erase and write operations in a manner specific to extending the lifespan of the machine-readable storage media 969.

One or the other of the volatile storage 961 or the non-volatile storage 962 may comprise an article of manufacture in the form of a machine-readable storage media on which a routine comprising a sequence of instructions executable by the processor circuit 950 may be stored, depending on the technologies on which each is based. By way of example, where the non-volatile storage 962 comprises ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to removable storage media such as a floppy diskette. By way of another example, the non-volatile storage 962 may comprise banks of solid-state storage devices to store information, such as sequences of instructions, in a manner akin to a compact flash card. Again, it is commonplace to employ differing types of storage devices in a computing device at different times to store executable routines and/or data. Thus, a routine comprising a sequence of instructions to be executed by the processor circuit 950 may initially be stored on the machine-readable storage media 969, and the removable media storage 963 may be subsequently employed in copying that routine to the non-volatile storage 962 for longer term storage not requiring the continuing presence of the machine-readable storage media 969 and/or the volatile storage 961 to enable more rapid access by the processor circuit 950 as that routine is executed.

As previously discussed, the interface 990 (corresponding to one or more of the interfaces 190, 390 and 590) may employ any of a variety of signaling technologies corresponding to any of a variety of communications technologies that may be employed to communicatively couple a computing device to one or more other devices. Again, one or both of various forms of wired or wireless signaling may be employed to enable the processor circuit 950 to interact with input/output devices (e.g., the depicted example keyboard 920 or printer 970) and/or other computing devices, possibly through a network (e.g., the network 999) or an interconnected set of networks. In recognition of the often greatly different character of multiple types of signaling and/or protocols that must often be supported by any one computing device, the interface 990 is depicted as comprising multiple different interface controllers 995*a*, 995*b* and 995*c*. The interface controller 995*a* may employ any of a variety of types of wired digital serial interface or radio frequency wireless interface to receive serially transmitted messages from user input devices, such as the depicted keyboard 920 (perhaps corresponding to one or more of the controls 120 and 520). The interface controller 995*b* may employ any of a variety of cabling-based or wireless signaling, timings and/or protocols to access other computing devices through the depicted network 999 (perhaps a network comprising one or more links, smaller networks, or perhaps the Internet). The interface 995*c* may employ any of a variety of electrically conductive cabling enabling the use of either serial or parallel signal transmission to convey data to the depicted printer 970. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, laser printers, ink-jet printers, mechanical robots, milling machines, etc.

Where a computing device is communicatively coupled to (or perhaps, actually comprises) a display (e.g., the depicted example display 980, corresponding to one or more of the displays 180 and 580), such a computing device implementing the processing architecture 3100 may also comprise the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

Further, where the display interface 985 is present in a computing device implementing the processing architecture 3100, an eye tracker 981 may also be coupled to the interface 985 to track eye movements of at least one eye of a person viewing the display 980. Alternatively, the eye tracker 981 may be incorporated into the computer architecture 3100 in some other manner. The eye tracker 981 may employ any of a variety of technologies to monitor eye movements, including and not limited to, infrared light reflection from the cornea.

The camera 910, if present, may employ any of a variety of technologies to capture images, including a CCD (charge-coupled device) element. Any of a variety of analog and/or digital interface technologies may be employed in coupling the camera 910, including various network technologies employing any of a variety of visual data transfer protocols.

More generally, the various elements of the devices 100, 300 and 500 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected"

and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

An example of an apparatus comprises a processor circuit and a storage communicatively coupled to the processor circuit and arranged to store instructions. The instructions are operative on the processor circuit to receive an image data comprising a first image; store the first image in an image database; receive a first eye movement data associated with the first image; determine a first identity of a first object at a first focus region in the first image indicated by the first eye movement data; and augment the image database with an indication of the first identity of the first object at the first focus region.

The above example of an apparatus in which the instructions are operative on the processor circuit to determine a second identity of a second object at a second focus region in the first image indicated by the first eye movement data; augment the image database with an indication of the second identity of the second object at the second focus region; derive a possible relationship between the first and second objects from a plurality of saccades specified by the first eye movement data as extending between the first and second focus regions; and augment the image database with an indication of the possible relationship between the first and second objects.

Either of the above examples of an apparatus in which the image database comprising an index, and the instructions operative on the processor circuit to augment the image database.

Any of the above examples of an apparatus in which the apparatus comprises an interface operative to communicatively couple the apparatus to a network, and the instructions operative on the processor circuit to receive the image data from a computing device via the network.

Any of the above examples of an apparatus in which the instructions are operative on the processor circuit to receive tag data associated with the first image; and augment the image database with the tag data.

Any of the above examples of an apparatus in which the tag data comprises one of an indication of a date on which the first image was captured, a time of day at which the first image was captured, a place at which the first image was captured, or an image category of the first image is classified.

Any of the above examples of an apparatus in which the instructions are operative on the processor circuit to receive a search criterion, the search criterion comprising one of a defined date of image capture, a defined time of day of image capture, a defined place of image capture, or a defined image category; search the image database for an image that meets the criterion; and provide the first image in response to a match between the search criterion and the tag data associated with the first image.

Any of the above examples of an apparatus in which the instructions are operative on the processor circuit to receive a second eye movement data associated with the first image; determine a second identity of a second object at a second focus region in the first image indicated by the second eye movement data; search the image database for an image that depicts the second object; and provide a second image that depicts the second object from the image database.

Any of the above examples of an apparatus in which the instructions are operative on the processor circuit to analyze the first image to identify the image category of the first image and augment the image database with the image category of the first image.

Any of the above examples of an apparatus in which the tag data comprises a text description of the first object as depicted in the first image, and the instructions operative on the processor circuit to receive a search text that describes a search object; search the image database for an image that depicts the search object; and provide the first image in response to the tag data that indicates the search object as depicted in the first image.

Any of the above examples of an apparatus in which the instructions are operative on the processor circuit to receive a second eye movement data associated with the first image; determine a second identity of a second object at a second focus region in the first image indicated by the second eye movement data; search the image database for an indication of an image that depicts the second object; and provide a second image that depicts the second object from the image database.

Any of the above examples of an apparatus in which the apparatus comprises a display, and the instructions are operative on the processor circuit to visually present the second image on the display.

Any of the above examples of an apparatus in which the instructions are operative on the processor circuit to augment the image database with the eye movement data, the eye movement data that indicates a pattern of eye movement from a viewing of the first image and search the image database for an image indicated as comprising a similar pattern of eye movement.

An example of another apparatus comprises a processor circuit and a storage communicatively coupled to the processor circuit and arranged to store instructions. The instructions are operative on the processor circuit to receive a first eye movement data associated with a first image from an image database stored in the storage; determine a first identity of a first object at a first focus region in the first image indicated by the first eye movement data; search the image database for an image that depicts the first object; and provide a second image that depicts the first object from the image database.

The above example of another apparatus in which the instructions are operative on the processor circuit to determine that the image database comprises no indication of the first focus region; and augment the image database with an indication of the first identity of the first object at the first focus region.

Either of the above examples of another apparatus in which the apparatus comprises a display, and the instructions are operative on the processor circuit to visually present the first and second images on the display.

Any of the above examples of another apparatus in which the apparatus comprises an interface operative to communicatively couple the apparatus to a network, and the instructions are operative on the processor circuit to receive the first eye movement data from a capture device via the network.

Any of the above examples of another apparatus in which the instructions are operative on the processor circuit to receive an image data comprising the first image; store the first image in the image database; determine the first identity of the first object at a focus region in the first image indicated by an eye movement data of the image data; and augment the image database with an indication of the first identity of the first object.

Any of the above examples of another apparatus in which the instructions are operative on the processor circuit to determine a second identity of a second object at a second focus region in the first image indicated by the eye movement data of the image data; augment the image database with an indication of the second identity of the second object; derive a possible relationship between the first and second objects from a plurality of saccades specified by the eye movement data of the image data; and augment the image database with an indication of the possible relationship between the first and second objects.

Any of the above examples of another apparatus in which the instructions are operative on the processor circuit to search the image database for an image that depicts the second object in response to the indication of the possible relationship between the first and second objects and provide a third image that depicts the second object from the image database along with the second image.

Any of the above examples of another apparatus in which the apparatus comprises a display, and the instructions are operative on the processor circuit to visually present the third image on the display.

An example of a computer-implemented method comprises receiving an image data comprising a first image; storing the first image in an image database; receiving tag data associated with the first image; augmenting the image database with the tag data; receiving a first eye movement data associated with the first image; determining a first identity of a first object at a first focus region in the first image indicated by the first eye movement data; and augmenting the image database with an indication of the first identity of the first object at the first focus region.

The above example of a computer-implemented method in which the method comprises determining a second identity of a second object at a second focus region in the first image indicated by the first eye movement data; augmenting the image database with an indication of the second identity of the second object at the second focus region; deriving a possible relationship between the first and second objects from a plurality of saccades specified by the first eye movement data as extending between the first and second focus regions; and augmenting the image database with an indication of the possible relationship between the first and second objects.

Either of the above examples of a computer-implemented method in which the image database comprising an index, and augmenting the image database comprises augmenting the index.

Any of the above examples of a computer-implemented method in which the tag data comprising one of an indication of a date on which the first image was captured, a time of day at which the first image was captured, and a place at which the first image was captured.

Any of the above examples of a computer-implemented method in which the method comprises receiving a search criterion, the search criterion comprising one of a defined date of image capture, a defined time of day of image capture, and a defined place of image capture; searching the image database for an image meeting the criterion; and providing the first image in response to the search criterion matching the tag data associated with the first image.

Any of the above examples of a computer-implemented method in which the method comprises receiving a second eye movement data associated with the first image; determining a second identity of a second object at a second focus region in the first image indicated by the second eye movement data; searching the image database for an image depicting the second object; and providing a second image depicting the second object from the image database.

Any of the above examples of a computer-implemented method in which the tag data comprising a text description of the first object as depicted in the first image, and the method comprises receiving a search text describing a search object; searching the image database for an image depicting the search object; and providing the first image in response to the tag data indicating the search object as depicted in the first image.

Any of the above examples of a computer-implemented method in which the method comprises receiving a second eye movement data associated with the first image; determining a second identity of a second object at a second focus region in the first image indicated by the second eye movement data; searching the image database for an image depicting the second object; and providing a second image depicting the second object from the image database.

An example of at least one machine-readable storage medium comprises instructions that when executed by a computing device, cause the computing device to receive a first eye movement data associated with a first image provided by the computing device from an image database stored in a storage of the computing device; determine a first identity of a first object at a first focus region in the first image indicated by the first eye movement data; search an image database of the image database for an indication of an image depicting the first object; and provide a second image depicting the first object from the image database.

The above example of at least one machine-readable storage medium in which the computing device is caused to determine that the image database comprises no indication of the first focus region and augment the image database with an indication of the first identity of the first object at the first focus region.

Either of the above examples of the at least one machine-readable storage medium in which the computing device is caused to receive an image data comprising the first image; store the first image in the image database; determine the first identity of the first object at a focus region in the first image indicated by an eye movement data of the image data; and augment the image database with an indication of the first identity of the first object.

Any of the above examples of the least one machine-readable storage medium in which the computing device is caused to determine a second identity of a second object at a second focus region in the first image indicated by the eye movement data of the image data; augment the image database with an indication of the second identity of the second object; derive a possible relationship between the first and second objects from a plurality of saccades specified by the eye movement data of the image data; and augment the image database with an indication of the possible relationship between the first and second objects.

Any of the above examples of the at least one machine-readable storage medium in which the computing device is caused to search the image database for an image depicting the second object in response to the indication of the possible relationship between the first and second objects and provide a third image depicting the second object from the image database along with the second image.

The invention claimed is:

1. An apparatus comprising:

a processor circuit; and a storage communicatively coupled to the processor circuit and arranged to store instructions operative on the processor circuit to:

receive an image data comprising a first image;

store the first image in an image database;

receive a first eye movement data associated with the first image;

identify a first focus region in the first image based on the first eye movement data;

determine a first identity of a first object at the first focus region in the first image; and augment the image database with an indication of the first identity of the first object at the first focus region.

2. The apparatus of claim 1, the instructions operative on the processor circuit to:

identify a second focus region in the first image based on the first eye movement data;

determine a second identity of a second object at the second focus region in the first image;

augment the image database with an indication of the second identity of the second object at the second focus region;

derive a possible relationship between the first and second objects from a plurality of saccades specified by the first eye movement data as extending between the first and second focus regions; and augment the image database with an indication of the possible relationship between the first and second objects.

3. The apparatus of claim 2, the image database comprising an index, and the instructions operative on the processor circuit to augment the image database.

4. The apparatus of claim 1, comprising an interface operative to communicatively couple the apparatus to a network, and the instructions operative on the processor circuit to receive the image data from a computing device via the network.

5. The apparatus of claim 1, the instructions operative on the processor circuit to:

receive tag data associated with the first image; and augment the image database with the tag data.

6. The apparatus of claim 5, the tag data comprising one of an indication of a date on which the first image was captured, a time of day at which the first image was captured, a place at which the first image was captured, or an image category of the first image is classified.

7. The apparatus of claim 6, the instructions operative on the processor circuit to:

receive a search criterion, the search criterion comprising one of a defined date of image capture, a defined time of day of image capture, a defined place of image capture, or a defined image category;

search the image database for an image that meets the criterion; and provide the first image in response to a match between the search criterion and the tag data associated with the first image.

8. The apparatus of claim 7, the instructions operative on the processor circuit to:

receive a second eye movement data associated with the first image;

identify a second focus region in the first image based on the second eye movement data;

determine a second identity of a second object at the second focus region in the first image;

search the image database for an image that depicts the second object; and provide a second image that depicts the second object from the image database.

9. The apparatus of claim 8, the instructions operative on the processor circuit to:

analyze the first image to identify the image category of the first image; and augment the image database with the image category of the first image.

10. The apparatus of claim 5, the tag data comprising a text description of the first object as depicted in the first image, and the instructions operative on the processor circuit to:

receive a search text that describes a search object;

search the image database for an image that depicts the search object; and provide the first image in response to the tag data that indicates the search object as depicted in the first image.

11. The apparatus of claim 10, the instructions operative on the processor circuit to:

receive a second eye movement data associated with the first image;

identify a second focus region in the first image based on the second eye movement data;

determine a second identity of a second object at the second focus region in the first image;

search the image database for an indication of an image that depicts the second object; and provide a second image that depicts the second object from the image database.

12. The apparatus of claim 11, comprising a display, and the instructions operative on the processor circuit to visually present the second image on the display.

13. The apparatus of claim 1, the instructions operative on the processor circuit to:

augment the image database with the eye movement data, the eye movement data to indicate a pattern of eye movement from a viewing of the first image; and search the image database for an image indicated as comprising a similar pattern of eye movement.

14. An apparatus comprising:

a processor circuit; and a storage communicatively coupled to the processor circuit and arranged to store instructions operative on the processor circuit to:

receive a first eye movement data associated with a first image from an image database stored in the storage;

identify a first focus region in the first image based on the first eye movement data;

determine a first identity of a first object at the first focus region in the first image;

search the image database for an image that depicts the first object; and provide a second image that depicts the first object from the image database.

15. The apparatus of claim 14, the instructions operative on the processor circuit to:

determine that the image database comprises no indication of the first focus region; and augment the image database with an indication of the first identity of the first object at the first focus region.

16. The apparatus of claim 14, comprising a display, and the instructions operative on the processor circuit to visually present the first and second images on the display.

17. The apparatus of claim 14, comprising an interface operative to communicatively couple the apparatus to a network, and the instructions operative on the processor circuit to receive the first eye movement data from a capture device via the network.

18. The apparatus of claim 14, the instructions operative on the processor circuit to:

receive an image data comprising the first image;

store the first image in the image database;

identify a focus region in the first image based on an eye movement data of the image data;

determine the first identity of the first object at the focus region in the first image; and augment the image database with an indication of the first identity of the first object.

19. The apparatus of claim 18, the instructions operative on the processor circuit to:

identify a second focus region in the first image based on the eye movement data of the image data;

determine a second identity of a second object at the second focus region in the first image;

augment the image database with an indication of the second identity of the second object;

derive a possible relationship between the first and second objects from a plurality of saccades specified by the eye movement data of the image data; and augment the image database with an indication of the possible relationship between the first and second objects.

20. The apparatus of claim 19, the instructions operative on the processor circuit to:

search the image database for an image that depicts the second object in response to the indication of the possible relationship between the first and second objects; and provide a third image that depicts the second object from the image database along with the second image.

21. The apparatus of claim 20, comprising a display, and the instructions operative on the processor circuit to visually present the third image on the display.

22. A computer-implemented method comprising:

receiving an image data comprising a first image;

storing the first image in an image database;

receiving tag data associated with the first image;

augmenting the image database with the tag data;

receiving a first eye movement data associated with the first image;

identifying a first focus region in the first image based on the first eye movement data;

determining, by a processor circuit, a first identity of a first object at the first focus region in the first image; and augmenting the image database with an indication of the first identity of the first object at the first focus region.

23. The computer-implemented method of 22, comprising:

identifying a second focus region in the first image based on the first eye movement data;

determining a second identity of a second object at the second focus region in the first image;

augmenting the image database with an indication of the second identity of the second object at the second focus region;

deriving a possible relationship between the first and second objects from a plurality of saccades specified by the first eye movement data as extending between the first and second focus regions; and augmenting the image database with an indication of the possible relationship between the first and second objects.

24. The computer-implemented method of claim 23, the image database comprising an index, and augmenting the image database comprises augmenting the index.

25. The computer-implemented method of 22, the tag data comprising one of an indication of a date on which the first image was captured, a time of day at which the first image was captured, and a place at which the first image was captured.

26. The computer-implemented method of 25, comprising:

receiving a search criterion, the search criterion comprising one of a defined date of image capture, a defined time of day of image capture, and a defined place of image capture;

searching the image database for an image meeting the criterion; and providing the first image in response to the search criterion matching the tag data associated with the first image.

27. The computer-implemented method of 26, comprising:

receiving a second eye movement data associated with the first image;

identifying a second focus region in the first image based on the second eye movement data;

determining a second identity of a second object at the second focus region in the first image;

searching the image database for an image depicting the second object; and providing a second image depicting the second object from the image database.

28. The computer-implemented method of 22, the tag data comprising a text description of the first object as depicted in the first image, and the method comprising:

receiving a search text describing a search object;

searching the image database for an image depicting the search object; and providing the first image in response to the tag data indicating the search object as depicted in the first image.

29. The computer-implemented method of 28, comprising:

receiving a second eye movement data associated with the first image;

identifying a second focus region in the first image based on the second eye movement data;

determining a second identity of a second object at the second focus region in the first image;

searching the image database for an image depicting the second object; and providing a second image depicting the second object from the image database.

30. At least one non-transitory machine-readable storage medium comprising instructions that when executed by a computing device, cause the computing device to:

receive a first eye movement data associated with a first image provided by the computing device from an image database stored in a storage of the computing device;

identify a first focus region in the first image based on the first eye movement data;

determine a first identity of a first object at the first focus region in the first image;

search the image database for an indication of an image depicting the first object; and provide a second image depicting the first object from the image database.

31. The at least one non-transitory machine-readable storage medium of claim 30, comprising instructions that when executed by the computing device, cause the computing device to:

determine that the image database comprises no indication of the first focus region; and augment the image database with an indication of the first identity of the first object at the first focus region.

32. The at least one non-transitory machine-readable storage medium of claim 30, comprising instructions that when executed by the computing device, cause the computing device to:

receive an image data comprising the first image;

store the first image in the image database;

identify a focus region in the first image based on an eye movement data of the image data;

determine the first identity of the first object at the focus region in the first image; and augment the image database with an indication of the first identity of the first object.

33. The at least one non-transitory machine-readable storage medium of claim 32, comprising instructions that when executed by the computing device, cause the computing device to:

identify a second focus region in the first image based on the eye movement data of the image data;

determine a second identity of a second object at the second focus region in the first image;

augment the image database with an indication of the second identity of the second object;

derive a possible relationship between the first and second objects from a plurality of saccades specified by the eye movement data of the image data; and augment the image database with an indication of the possible relationship between the first and second objects.

34. The at least one non-transitory machine-readable storage medium of claim 33, comprising instructions that when executed by the computing device, cause the computing device to:

search the image database for an image depicting the second object in response to the indication of the possible relationship between the first and second objects; and provide a third image depicting the second object from the image database along with the second image.

* * * * *